US011221796B2

(12) United States Patent
Cook et al.

(10) Patent No.: US 11,221,796 B2
(45) Date of Patent: Jan. 11, 2022

(54) REDIRECTION OF I/O REQUESTS FROM LOCAL TO REMOTE STORAGE LOCATIONS TO IMPROVE NETWORK PERFORMANCE AND DATA REDUNDANCY

(71) Applicant: MICROSOFT TECHNOLOGY LICENSING, LLC, Redmond, WA (US)

(72) Inventors: Randall Richards Cook, Redmond, WA (US); Kevin John Goodman, Alpharetta, GA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 374 days.

(21) Appl. No.: 16/399,573

(22) Filed: Apr. 30, 2019

(65) Prior Publication Data

US 2019/0339907 A1    Nov. 7, 2019

Related U.S. Application Data

(60) Provisional application No. 62/665,237, filed on May 1, 2018.

(51) Int. Cl.
*G06F 3/06* (2006.01)
*H04L 29/08* (2006.01)
*G06F 16/182* (2019.01)

(52) U.S. Cl.
CPC ............ *G06F 3/0659* (2013.01); *G06F 3/061* (2013.01); *G06F 3/067* (2013.01); *G06F 3/0635* (2013.01); *G06F 3/0664* (2013.01); *G06F 16/182* (2019.01); *H04L 67/1097* (2013.01)

(58) Field of Classification Search
None
See application file for complete search history.

(56) References Cited

U.S. PATENT DOCUMENTS

2011/0119668 A1* 5/2011 Calder ................. G06F 3/0661
718/1

FOREIGN PATENT DOCUMENTS

| EP | 2494456 A2 | 9/2012 |
|----|------------|--------|
| WO | 2011053450 A2 | 4/2011 |
| WO | 2017205520 A1 | 11/2017 |

OTHER PUBLICATIONS

"International Search Report and Written Opinion Issued in PCT Application No. PCT/US19/030283", dated Aug. 6, 2019, 11 Pages.

* cited by examiner

*Primary Examiner* — Scott C Sun
(74) *Attorney, Agent, or Firm* — Newport IP, LLC; Leonard J. Hope

(57) ABSTRACT

Technologies are disclosed for redirecting input/output ("I/O") requests to virtual hard disks ("VHDs") to improve network performance and data redundancy. More particularly, files can be encapsulated in remote VHDs and accessed in such a way that the files appear to a local operating system and any local applications to be residing locally. Furthermore, I/O requests redirected to files encapsulated in VHDs may also be redirected to one or more additional VHDs for data redundancy. The redirected I/O requests may be transmitted simultaneously but separately to the additional VHDs in a split stream.

20 Claims, 13 Drawing Sheets

REDIRECTION OF I/O REQUESTS FROM LOCAL TO REMOTE STORAGE LOCATIONS TO IMPROVE NETWORK PERFORMANCE AND DATA REDUNDANCY

CROSS-REFERENCE TO RELATED APPLICATIONS

This application claims priority under 35 U.S.C. § 119(e) to U.S. Provisional Patent Application No. 62/665,237, filed on May 1, 2018, and titled "SPLIT STREAM DRIVER," the entire disclosure of which is expressly incorporated by reference herein in its entirety.

BACKGROUND

Computer operating systems ("OSs") (which might be referred to herein as an "OS") can be configured to enable access to files stored at remote computing systems. Mechanisms for accessing files stored at such remote computing systems (sometimes called "network shares") are commonly implemented using the Server Message Block ("SMB") protocol, which might be referred to as the Common Internet File System ("CIFS").

While CIFS network shares can provide convenient access to files stored at remote computing systems, these types of network shares also suffer from several serious technical limitations. For example, CIFS network shares can perform poorly when multiple users simultaneously access files on the same CIFS share and when a single user is accessing a large file.

In some instances, large files can be stored on a user's local computer rather than on a network share to improve performance. However, in other instances, such as in virtual desktop infrastructure ("VDI") or Remote Desktop Session Host ("RDSH") systems, it is either not possible or impractical to persist a large file locally (e.g., because the OS does not permit this type of storage or the file is too large to be stored locally).

It is with respect to these and other technical challenges that the disclosure made herein is presented.

SUMMARY

Technologies are disclosed for redirection of input/output ("I/O") requests to improve network performance and data redundancy. Through implementations of the disclosed technologies, computing and network performance when accessing network shares can be improved. Additionally, data redundancy can be improved by redirecting I/O requests to multiple remotely-located virtual hard disks ("VHDs"). Other technical benefits not specifically mentioned herein can also be realized through implementations of the disclosed subject matter.

In order to realize the technical benefits mentioned briefly above, locations on a local file system can be configured such that I/O requests made to the locations are redirected to a remotely-located VHD. The locations on the local file system are configured such that local files appear to reside locally to a local OS and local applications, thus overcoming some of the performance issues associated with multiple users accessing a single network share (e.g. a CIFS share) and with a single user remotely accessing a large file.

The disclosed technologies also allow for more than one VHD to be maintained on a network share. I/O requests performed on one VHD may result in identical or substantially similar requests being performed on one or more other VHDs. Maintaining more than one VHD in a network share in this manner may allow for use of the more than one VHDs to be distributed amongst users, or the network share may reserve the VHDs as backups in the event of a primary VHD failure (or a failure at the local system).

These and other embodiments, features, and benefits of the claimed invention(s) will become apparent from the following detailed written description of the preferred embodiments and embodiments taken in conjunction point with the following drawings, although variations and modifications thereto may be affected without departing from the spirit and scope of the novel concepts of the disclosure.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
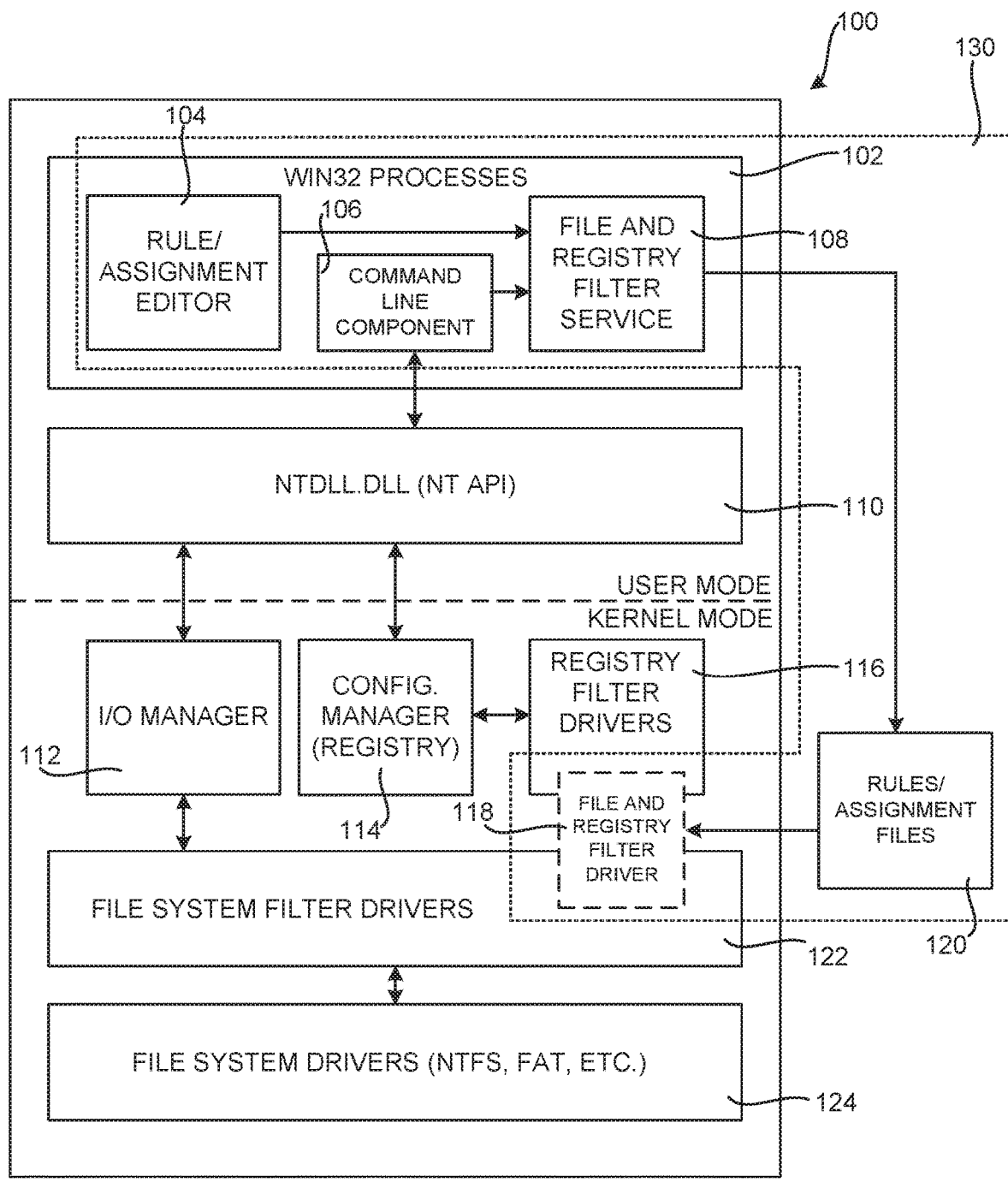
FIG. 1 is a software architecture diagram illustrating aspects of the configuration and operation of a computing system configured to implement the technologies disclosed herein, according to one embodiment of the present disclosure.

The following detailed description is directed to technologies for redirection of I/O requests to improve network performance and data redundancy. As discussed briefly above, implementations of the disclosed technologies can improve network performance and data redundancy. Other technical benefits not specifically mentioned herein can also be realized through implementations of the disclosed subject matter.

While the subject matter described herein is presented in the general context of a computing system executing a MICROSOFT WINDOWS NT-based operating system, those skilled in the art will recognize that other implementations can be performed in combination with other types of operating systems and computing systems. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a computing system configured for redirection of I/O requests to improve network performance and data redundancy will be described.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Embodiments of the present disclosure generally relate to the reduction of network traffic required to support operations on a file stored remotely on a file server or network share. More particularly, the disclosed technologies relate to generating a split stream of data to more than one VHD location for maintaining robust and redundant VHD instances while also efficiently managing network resources.

More particularly, the disclosed technologies enable remotely stored files to appear to a local OS and any local applications to be residing locally, thus overcoming some of the performance issues associated with multiple users accessing a single network share (e.g., a CIFS share) and a single user remotely accessing a large file. Furthermore, the disclosed technologies may allow for more than one of these types of files to be maintained on a network share, where requests performed on one file may result in substantially similar requests being performed on the other file. Maintaining more than one VHD in a network share may allow for use of the more than one VHDs to be distributed amongst users, or the network share may reserve the VHDs as backups in the event of a primary VHD failure.

According to particular embodiments, the technologies disclosed herein include a service that runs on a computing device that makes changes to the system in order to direct OS requests to remote files, as opposed to local files or shares. For example, a large file, such as a MICROSOFT OUTLOOK data file may be encapsulated in a VHD. Continuing with this example, the service running on the user's computer may be configured to modify the MICROSOFT OUTLOOK data file default folder on the user's system, such that the OS is directed to access the encapsulated MICROSOFT OUTLOOK data file on the remotely-located VHD instead.

In particular embodiments, the service disclosed herein, for example, might rename the existing folder "C:\users\<username>\AppData\Local\Microsoft\Outlook" on a user's computing device to "C:\users\<username>\AppData\Local\Microsoft\Outlook.hold". The service then, in this embodiment, creates a junction point at C:\users\<username>\AppData\Local\Microsoft\Outlook that points to the VHD storing the encapsulated MICROSOFT OUTLOOK data file. In this way, when the user's OS searches for C:\users\<username>\AppData\Local\Microsoft\Outlook, it is redirected to the MICROSOFT OUTLOOK data file in the remotely-located VHD and the original data located at C:\users\<username>\AppData\Local\Microsoft\Outlook is now "hidden" from the OS at C:\users\<username>\Appdata\Local\Microsoft\Outlook.hold.

In certain embodiments, the service running on the user's computer may be configured to access (e.g., transmit to, read from, etc.) data files on one or more VHDs and/or one or more split stream VHD locations. Continuing with the example above referencing particular data paths on a local hard drive, the service may be configured to create a junction point at a particular data path that points to the location of a VHD (a "VHD location") that includes an encapsulated file, thereby allowing I/O requests (e.g. read requests and write requests) generated at the user's computing device that are initially directed to a local path or directory to be redirected to the junction point-defined VHD location.

Generally, the junction point makes the VHD appear to applications as if it is located at the original file path of the original file/folder. Thus, the files/folders encapsulated on the VHD appear to be the original file(s)/folder(s) located local to the computing device and applications that modify their behavior based upon whether a file is remote or local will operate as if the original file were still present locally.

According to various aspects of the present disclosure, references or pointers to additional VHD locations may be persisted in a configuration file accessible by the service, persisted in a service registry, etc. In one embodiment, any request directed to a local path (e.g., a memory address in a local cache) may trigger the service to redirect the request to the VHD location configured via the junction point, as well as any additionally persisted VHD locations. Various aspects of the above process will be discussed in further detail below. Prior to discussing exemplary processes, an exemplary operating environment for implementing the technologies disclosed herein will be described.

Exemplary Architecture

As discussed herein, the disclosed technologies relate to encapsulation of a remotely located file in such a way that the file appears to the local OS and any local applications to be residing locally. Furthermore, the disclosed mechanisms allow for additional VHDs or VHD locations to include redundant backups of the encapsulated remote file, and for these additional VHD locations to be efficiently accessed via a split stream transmitted from the service.

In particular embodiments, a service is implemented within an OS environment to perform aspects of the disclosed functionality. In some embodiments, the service intercepts requests, such as Input/Output ("I/O") requests or registry requests, evaluates rules based on the intercepted requests during runtime, and/or performs actions based on the rule evaluations, such as passing requests through, redirecting requests, modifying requests, hiding resources, or performing other actions.

The disclosed service might be implemented in one or more of a computing device's file system filter drivers and registry filter drivers as a terminal configuration management service. In some embodiments, the terminal configuration management service is implemented as, or is configured with the functionality of, a file system filter driver and a registry filter driver (which might be referred to herein as a file and registry filter driver (or simply a "filter driver").

FIG. 1 is a simplified block diagram of an embodiment of a typical WINDOWS NT-based OS structure 100, including Win32 processes 102 (rule/assignment editor 104, command line component 106, and file and registry filter service 108, which are described below), an NTDLL.DLL 110, an I/O manager 112, a configuration manager (registry) 114, registry filter drivers 116, file system filter drivers 122, and file system drivers 124. Win32 processes 102 are the applications and services that are running on a computing device executing the WINDOWS OS.

Win32 processes initiate calls to the file system filter drivers 122 (which interact with the underlying file system) and the configuration manager 114 by calling Win32 application programming interfaces ("APIs") (not shown), such as CreateFile, RegOpenKey, etc. The Win32 API layer in turn calls corresponding user mode NT APIs (not shown) in the NTDLL.DLL 110, which provides the native WINDOWS NT API set. For example, NTDLL.DLL 110 includes user mode WINDOWS NT APIs like NtCreateFile, NtOpenKey, etc. User mode NT APIs typically match up one-to-one with a kernel mode API. For example, NtCreateFile maps to the ZwCreateFile API.

In some embodiments, a rule/assignment editor tool 104, which may be implemented as a program module, plug-in, script, or other type of Win32 process, may be provided to facilitate the creation and modification of rules and assignments. The rule/assignment editor tool 104 may, in some embodiments, be a graphical user interface ("GUI")-based tool. Alternatively, or additionally, a command line component 106, can be provided for creating and adding rules/assignments, deleting rules/assignments, triggering reloads of rules/assignments files 120 by the filter driver 118, etc. These components may be provided on the computing device where the filter driver 118 is executed and/or may be provided on an administrator computing device such that the rules/assignments files 120 can be distributed to any number of computing devices.

A file and registry filter service 108 might also be provided to operate in conjunction with the filter driver 118. The file and registry filter service 108 might be implemented as an executable or other type of program module. This service may be configured to accept commands from the command line component 106 and/or the rule/assignment editor tool 104, compile rules/assignments files 120 from user format to driver format, watch for updates to rules/assignments file(s) 120 appear, and notify the filter driver 118 when such updates are detected.

The file and registry filter service 108 may be provided on the computing device where the filter driver 118 is executed and/or on an administrator computing device. For example, the file and registry filter service 108 may determine that new rules/assignments files 120 have been created, compile those files and store them in a folder or other location accessible to the filter driver 118. The file and registry filter service 108 may then notify the filter driver 118 that there are new rules/assignments files 120 to process.

In various embodiments, the I/O manager 112 takes the parameters passed to a particular function and creates a corresponding Interrupt Request Packet ("IRP"). An IRP is a memory structure that contains information about a request that will be passed to lower level components within an OS storage stack. In some embodiments, file system filter drivers ("FSFDs") 122 are kernel components that are loaded and inserted into the communication path between the I/O manager 112 and the file system drivers 124. FSFDs 122 "intercept" I/O requests within the OS prior to processing by the file system drivers 124.

FSFDs 122 are kernel-mode drivers that add value to or modify the behavior of a file system. A FSFD 122 can filter I/O operations for one or more file systems or file system volumes. Depending on the nature of the FSFD 122, filter can mean log, observe, modify, or even prevent. Typical applications for FSFDs 122 include, but are not limited to, antivirus utilities, encryption programs, and hierarchical storage management systems.

FSFDs 122 can be implemented in a stack each having a configurable priority. In some configurations (e.g., in WINDOWS 7 and later versions of WINDOWS NT-based OSs), a FSFD 122 is implemented as a filter manager that provides for the creation and management of "mini-filter drivers," which can perform functions such as antivirus, undelete, backup, virtualization, activity monitoring, or other functions.

According to some embodiments, the configuration manager 114 implements a registry, handles all registry API calls, and stores the registry information in multiple database files. In at least one embodiment, the configuration manager 114 provides a filtering interface that allows for the implementation of registry filter drivers 116. Registry filter drivers 116 can be implemented as kernel components that register with the configuration manager 114 to intercept, handle, and possibly modify registry calls. Registry filter drivers 116 can thus be configured as registry I/O handlers.

In the embodiment shown in FIG. 1, the filter driver 118 is configured to perform the functionality described below with respect to FIGS. 2-11 and elsewhere herein and is implemented within the FSFD 122 stack and the registry filter driver 116 stack. For example, portions of the filter driver 118 may be implemented as a FSFD 122 (or a mini-filter driver) and portions may be implemented as a registry filter driver 116. Other implementations of the filter driver 118 will also be apparent to those of skill in the art. Thus, I/O requests handled by the I/O manager 112 and registry I/O requests handled by the configuration manager 114 can be intercepted and handled by the filter driver 118.

In various embodiments, which will be described in more detail below, the functionality provided by the filter driver 118 allows the presence of a directory, file, registry key, registry value or other resource (e.g., a MICROSOFT OUTLOOK data file) to be hidden from view. These objects may remain stored upon a local storage device but are hidden from users.

In some embodiments, the filter driver 118 creates a junction point that redirects OS requests to a new directory, file, or resource (e.g. a VHD). In further embodiments, the filter driver 118 attaches to or detaches from one or more VHDs. In particular embodiments, the filter driver 118 may transmit intercepted I/O requests to additional VHD locations, in a split stream. As discussed above, the junction point makes the VHD appear to applications as if it is located at the original file path of the original file/folder. Thus, the files/folders encapsulated on the VHD appear to be the original file(s)/folder(s) located local to the computing device and applications that modify their behavior based upon whether a file is remote or local will operate as if the original file were still present locally.

According to various aspects of the present disclosure, data describing additional VHD locations may be persisted in a registry or configuration file accessible by the filter driver 118. In certain embodiments, the filter driver 118 may not only redirect intercepted I/O requests to the VHD location configured according to the junction point, but also the intercepted requests may be transmitted to the additionally persisted VHD locations (in a split stream transmission).

The filter driver 118 can be configured to hide different resources or types of resources for different users, for example based on access authorization credentials or other criteria assigned to or associated with a user or group of users. For example, different sets of resources may be hidden for different users or different groups of users, who each may therefore have a significantly different view of the files stored at the same computing device.

In some embodiments, the filter driver 118 may be configured to hide different resources or types of resources for or during different processes, threads, sessions, etc. In some embodiments, the filter driver 118 may be configured to start or stop hiding certain resources, change file names, and/or attach/detach VHDs based on trigger events such as schedule, location of the user and/or computing device, network access, etc.

In particular embodiments, if the filter driver 118 were to lose a connection to an attached VHD (e.g., a primary VHD), the filter driver 118 may connect to a secondary VHD and perform I/O operations against the secondary VHD, where the secondary VHD includes substantially similar data as the primary VHD. According to various aspects of the present disclosure, the secondary VHD includes substantially similar data as the primary VHD because intercepted I/O requests transmitted to the primary VHD may also be transmitted to additional VHD locations, as configured by a user of the service.

The operations to be performed by the filter driver 118 may be specified by way of one or more rules/assignments files 120. For example, an administrator can create a rule that specifies one or more objects to be hidden or changed (file, directory, key, or value) and any applicable conditions or trigger events. The administrator may then assign the rule to one or more specific user or groups of users. In some embodiments, rules may be stored in one file and corresponding assignments may be stored in another associated file. In other embodiments, rules and corresponding assignments may be stored in the same file. Other mechanisms for implementing rules and assignments will be apparent to those skilled in the art and are deemed to be within the scope of this disclosure.

Exemplary Processes

The following is a description of exemplary processes that may be executed by a computing device implementing the architectural components discussed above. As will be understood from the disclosure presented herein, the rule/assignment editor 104, command line component 106, file and registry filter service 108, rules/assignment files 120, and filter driver 118 may operate together or alone to complete some or all of the operations discussed below. Therefore, for simplicity and brevity, but not for the purpose of limitation, these components will collectively be referred to below as the "service 130."

Figure 2:
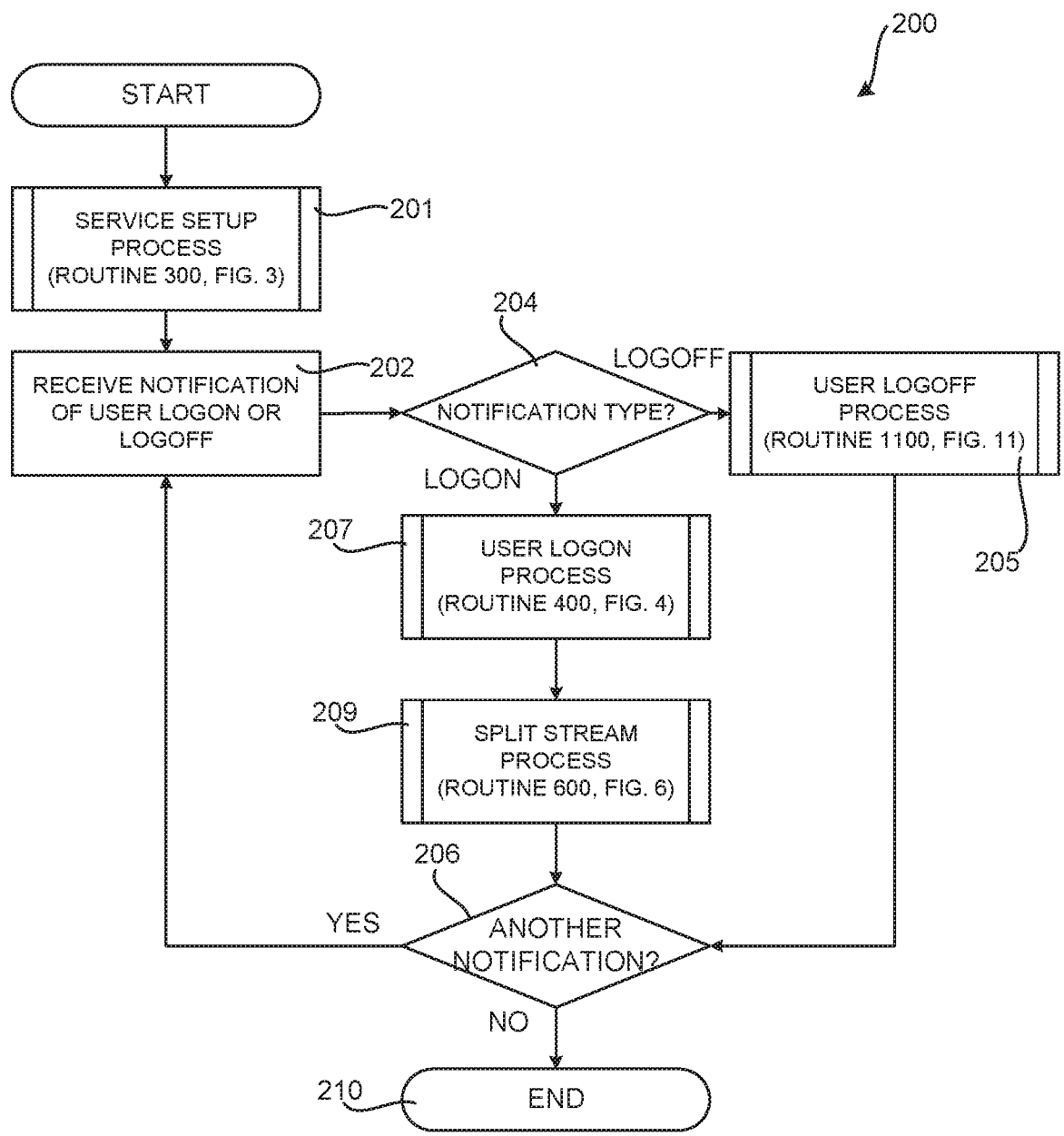
FIG. 2 is a flow diagram showing a routine that illustrates aspects of an exemplary system process, according to one embodiment of the present disclosure.

FIG. 2 is a flow diagram showing a routine 200 that illustrates aspects of an exemplary, high-level overview of the operation of the disclosed technologies, according to one embodiment disclosed herein. In particular, the routine 200 illustrates aspects of a process by which the service 130 presents a VHD to a software program or OS such that the VHD appears to be local to the computing device on which the software program or OS is executing. By exposing the VHD in this manner, the computing device or a software program operating on the same may access a file and/or folder encapsulated in the VHD. Thus, in various embodiments, the service 130 is able to permit remote access to files that usually must be locally stored for proper operation.

For example, the service 130 may replace a MICROSOFT OUTLOOK data file that usually must be kept locally with a data file located on a remote VHD so that MICROSOFT OUTLOOK may operate more efficiently. In order to provide this functionality, the service 130 can change the file path of the original file/folder at operation so that the software program that uses that original file/folder can no longer access it at its original location. In this way, the original file/folder is essentially "hidden" from the software program/OS/user but has not been deleted.

The service 130 then creates a junction point that redirects requests generated by the OS or software program to the VHD. Generally, the junction point makes the VHD appear to applications as if it is located at the original file path of the original file/folder. Thus, the files/folders encapsulated on the VHD appear to be the original file(s)/folder(s) located local to the computing device and applications that modify their behavior based upon whether a file is remote or local will operate as if the original file were still present locally.

It should be appreciated that the logical operations described herein with regard to FIG. 2, and the other FIGS., can be implemented (1) as a sequence of computer implemented acts or program modules running on a computing device and/or (2) as interconnected machine logic circuits or circuit modules within a computing device. The particular implementation of the technologies disclosed herein is a matter of choice dependent on the performance and other requirements of the computing device.

Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where a service setup process is performed, wherein the service 130 is started by the OS (e.g., when the OS starts after a computing device is turned on) and registers with the OS to receive notifications of user logon and logoff activity. After registering with the OS, the service 130, in one embodiment, executes in the background of the OS until the computing device is turned off. Details regarding one illustrative service setup process will be provided below with regard to FIG. 3.

At operation 202, in various embodiments, the service 130 receives a notification of user logon or logoff activity from the OS. Generally, this notification corresponds to either a user logging on to use the OS (e.g., after turning on the computing device) or logging off after using the OS (e.g., before turning off the computing device). Thus, in one embodiment, the service 130 determines, at operation 204, whether the notification is of a user logon or logoff (e.g., based on the header of the notification, the structure of the notification, etc.).

If the notification is of a user logon, then, in one embodiment, the service 130 proceeds to operation 207, where a user logon process is performed. In various embodiments, the service 130 determines the appropriate VHD to attach to the computing device and makes the appropriate changes to the file paths of any original files/folders that the VHD is replacing during the user logon process. Details regarding one illustrative user logon process are provided below with regard to FIG. 4.

In various embodiments, after the user logon routine is performed, the exemplary routine 200 proceeds to operation 209, where a split stream process is performed. As discussed briefly above, the split stream process causes requests to be transmitted simultaneously but separately in different streams to VHD locations. Additional details regarding the split stream process will be provided below with regard to FIG. 6.

If the notification received at operation 202 is of a user logoff, then, in one embodiment, the routine 200 proceeds to operation 205, where a user logoff routine is performed. In the user logoff routine, the VHD is detached and the junction point is removed such that the files/folders are restored to their original file paths.

According to various aspects of the present disclosure, more than one VHD may be attached to a computing device, or the service 130 may redirect intercepted I/O requests to more than one VHD location. In particular embodiments, intercepted I/O requests (e.g. read and write requests) may be transmitted to a local cache and furthermore redirected to the encapsulated file at the attached VHD, and/or the intercepted I/O request may be redirected to one or more additional VHD locations. In certain embodiments, references or pointers to the one or more additional VHD locations may be persisted in a registry or configuration file accessible by the filter driver 118, and the intercepted I/O request may be transmitted simultaneously but separately in split streams to the additional VHD locations.

In one embodiment, implementing a split stream of I/O requests improves computing functionality such that the VHDs associated with the OS are updated quicker, the split stream data writing generally promotes a lower latency computing environment, and the system benefits from improved data redundancy. In some embodiments, the system continues processing requests using the disclosed split stream process for an indefinite amount of time as long as I/O requests are directed to storage locations that have been redirected to a VHD by way of a junction point.

After the split stream routine or user logoff routine, in various embodiments, the service 130 determines, at operation 206, whether to wait for another notification based on one or more predefined rules. If the service 130 determines, at operation 206, to wait for another notification, then the service 130 returns to operation 202, waits for another notification, and processes the notification in the manner described above The service 130 may wait for another notification because the previously-received notification was of a user logon and, thus, a user logoff notification will be forthcoming or because the user has logged off of the OS but not turned off the computing device. If, however, the service 130 determines, at operation 206, not to wait for another notification (e.g., the computing device is being shut down, etc.), then the exemplary process 200 proceeds to operation 210, where it ends.

Figure 3:
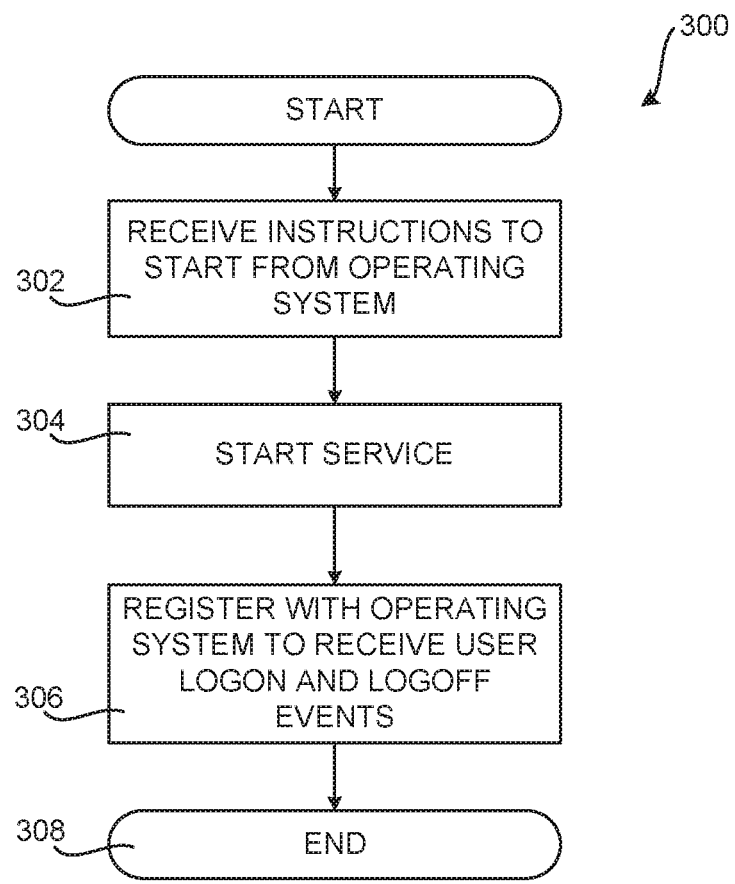
FIG. 3 is a flow diagram showing a routine that illustrates aspects of an exemplary service setup process, according to one embodiment of the present disclosure.

Referring to FIG. 3, a routine 300 illustrating aspects of an exemplary service setup process will be described. The routine 300 begins at operation 302 when an OS provides instructions to the service 130 to start. The routine 300 then proceeds from operation 302 to operation 304, where the service 130 starts upon receiving a specific instruction from the OS. In some embodiments, operation 302 is optional and the service 130 starts automatically, at operation 304, upon startup of the OS.

Generally, in various embodiments, the service 130 executes as a background process, or processes. After starting, in various embodiments, the service 130 registers, at operation 306, with the OS to receive notifications of user logon and logoff events. The routine 300 then proceeds from operation 306 to operation 308, where it ends. As will be apparent to one having ordinary skill in the art, this registration permits the service 130 to know when to take certain actions (e.g., initiate processes, attach/detach VHD, etc.).

Figure 4:
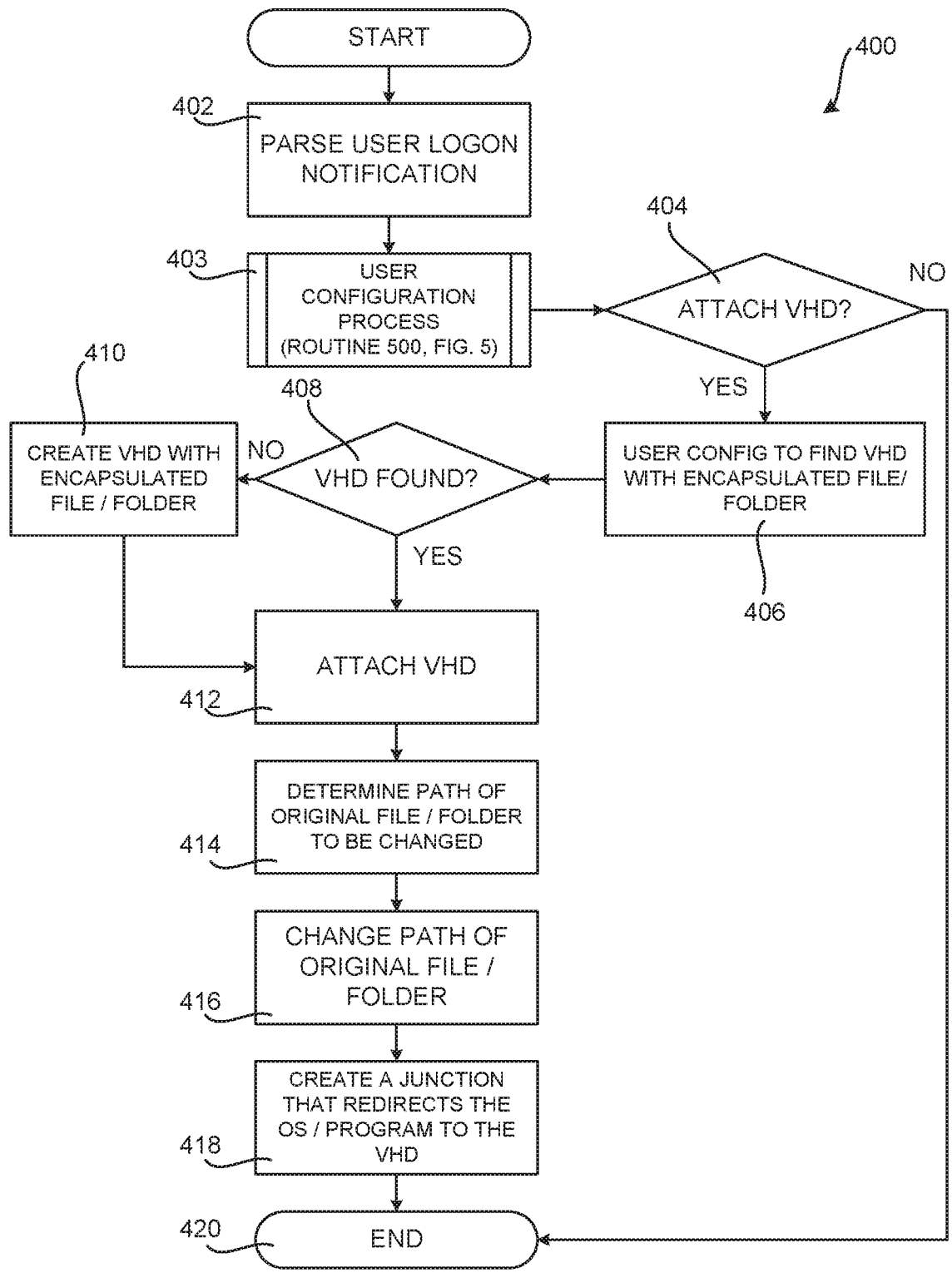
FIG. 4 is a flow diagram showing a routine that illustrates aspects of an exemplary user logon process, according to one embodiment of the present disclosure.

Referring now to FIG. 4, a routine 400 will be described that illustrates aspects of an exemplary user logon process. Generally, the user logon process is a process by which the service 130 identifies the appropriate VHD to attach to the computing device and makes the appropriate changes to the file paths of any original files/folders that the VHD is replacing. For example, the service 130 may encapsulate MICROSOFT OUTLOOK data files within a VHD and redirect OS requests from the location of a locally-stored MICROSOFT OUTLOOK data file to the remotely-located encapsulated files. Once redirected, the MICROSOFT OUTLOOK software program can access the files within the VHD as if they were local to the computing device on which the service 130 is executing.

The routine 400 begins, in various embodiments, at operation 402, wherein the service 130 parses a user logon notification to retrieve a user identification corresponding to the user that is currently logged in to the OS. Generally, the service 130 may extract other data from the logon notification at operation 402 as appropriate (e.g., time and date information for analytics purposes, the network address of the computing device for security purposes, etc.).

From operation 402, the routine 400 proceeds to operation 404, where the service 130 may use the data extracted/parsed from the user logon notification to determine whether to encapsulate a particular file for the user in a VHD. Additional details regarding this process will be provided below with regard to FIG. 5.

From operation 403, the routine 400 proceeds to operation 404, where the service 130 determines whether to attach a VHD, in one embodiment, based on the results of the user configuration routine described below with regard to FIG. 5.

If the service 130 determines, at operation 404, not to attach a VHD, then the routine 400 proceeds from operation 404 to operation 420, where it ends.

If, however, the service 130 determines, at operation 404, to attach a VHD, then the routine 400 proceeds from operation 404 to operation 406. At operation 406, in one embodiment, the service 130 searches for the appropriate VHD (with the correct encapsulated file/folder) for the user, based on the results of the user configuration routine described below with regard to FIG. 5.

In one embodiment, a user is associated with a particular configuration that identifies the file(s)/folder(s) that will be encapsulated on VHDs. In some embodiments, the service 130 uses a lookup table to determine which VHD (or VHDs) is associated with a particular user. Accordingly, at operation 408, the service 130 determines, in one embodiment, whether the appropriate VHD was found (at operation 406).

If the service 130 determines at operation 408 that the appropriate VHD was not found, then, in one embodiment, the routine 400 proceeds from operation 408 to operation 410, where the service 130 creates a VHD with the appropriate encapsulated file/folder. For example, the service 130 may create a VHD if the user logging on to the OS has never logged on previously, or if the user deleted a previously created VHD.

Generally, once attached, the VHD appears to the computing device like any other attached file system (e.g., thumb drive, etc.), so the file/folder is stored within this file system, as part of operation 410, according to methods known in the art to store files within a file system. Generally, after creating the VHD at operation 410 or if the service 130 determines, at operation 408, that the appropriate VHD was found (at operation 406), then, in various embodiments, the routine 400 proceeds to operation 412, where the service 130 attaches the VHD to the computing device. As will be understood, this disclosure places no limitations on the type of VHD, file/folders encapsulated within the VHD, OS, computing device, or method of attaching the VHD to the OS/computing device. By attaching the VHD, the computing device may now access the files/folder encapsulated within the same.

In one embodiment, the service 130 uses APIs provided by the OS to attach the VHD at operation 412. For example, when executing on the WINDOWS OS, the service 130 may use the following APIs: OpenVirtualDisk, CreateVirtualDisk, AttachVirtualDisk, and DetachVirtualDisk. These APIs are merely illustrative, however, and other APIs can be utilized in other configurations.

From operation 412, the routine 400 proceeds to operation 414, where the service 130 determines the file path of the original file/folder that is to be redirected to file(s)/folder(s) encapsulated within the VHD attached at operation 412. The service 130 then changes the file path of the original file/folder at operation 416 so that the software program that uses that original file/folder can no longer access it. In this way, the original file/folder is essentially "hidden" from the software program/OS/user but has not been deleted, so it could still be used, if its location was known (e.g., by renaming the path by adding a ".hold" or other method).

In various embodiments, at operation 418, the service 130 creates a junction point that redirects requests generated by the OS or software program to the VHD. Generally, the junction point makes the VHD appear as if it is located at the original file path of the original file/folder determined at operation 414. Thus, the files/folders encapsulated on the VHD appear to be the original file(s)/folder(s) located local to the computing device. Consequently, applications that modify their behavior based upon whether a file is remote or local will operate as if the original file were still present locally.

Figure 5:
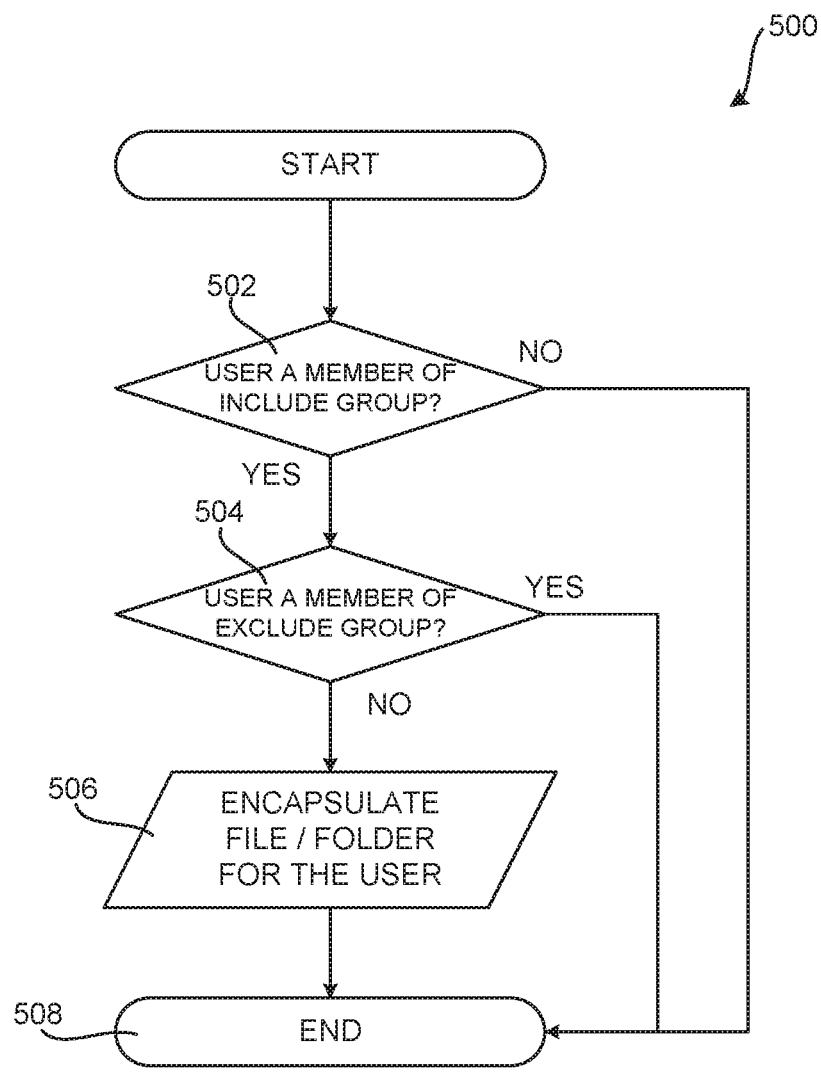
FIG. 5 is a flow diagram showing a routine that illustrates aspects of an exemplary user configuration process, according to one embodiment of the present disclosure.

Referring now to FIG. 5, a routine 500 will be described that illustrates aspects of an exemplary user configuration process. The exemplary user configuration process is a process by which the service 130 determines whether to encapsulate a file/folder for a user that has just logged on to the OS.

The routine 500 begins at operation 502, where the service 130 determines whether the current user is a member of an "include" group that specifies users for which requests are to be redirected to VHDs in the manner described herein. If the user is not a member of the include group, the routine 500 proceeds from operation 502 to operation 508, where it ends. If, however, the user is a member of the include group, then the service 130 determines whether the user is a member of the "exclude" group at operation 504. The exclude group identifies users for which requests are not to be redirected to VHDs in the manner described herein.

If the user is a member of the exclude group, the routine 500 proceeds from operation 504 to operation 508, where it ends. For example, an administrator may have included "all users" in the include group but decided that certain specific users should be in the exclude group (instead of trying to individually select all users except the board members to initially populate the include group).

If the user is not a member of the exclude group, then the service 130 determines, at operation 506, whether to encapsulate a file/folder for this user according to one or more predefined rules. The routine 500 then proceeds from operation 506 to operation 508, where it ends.

In one embodiment, not shown in FIG. 5, the service 130 also generates, at operation 506, a configuration that designates the particular file(s)/folder(s) to be encapsulated on the particular VHD (used by the service 130 at operation 406 in FIG. 4). In some embodiments, the VHD locations for a split stream transmission may be configured according to include/exclude groups, or the like. For example, the service 130 may determine that for a particular intercepted I/O request, the request is to be redirected to a group of VHD locations from an include group, where the references or pointers corresponding to the include group may be defined in a registry or configuration file. Accordingly, and in certain embodiments, there may be one or more additional VHD locations that do not receive the redirected I/O request because these VHD locations may belong to an exclude group.

Figure 6:
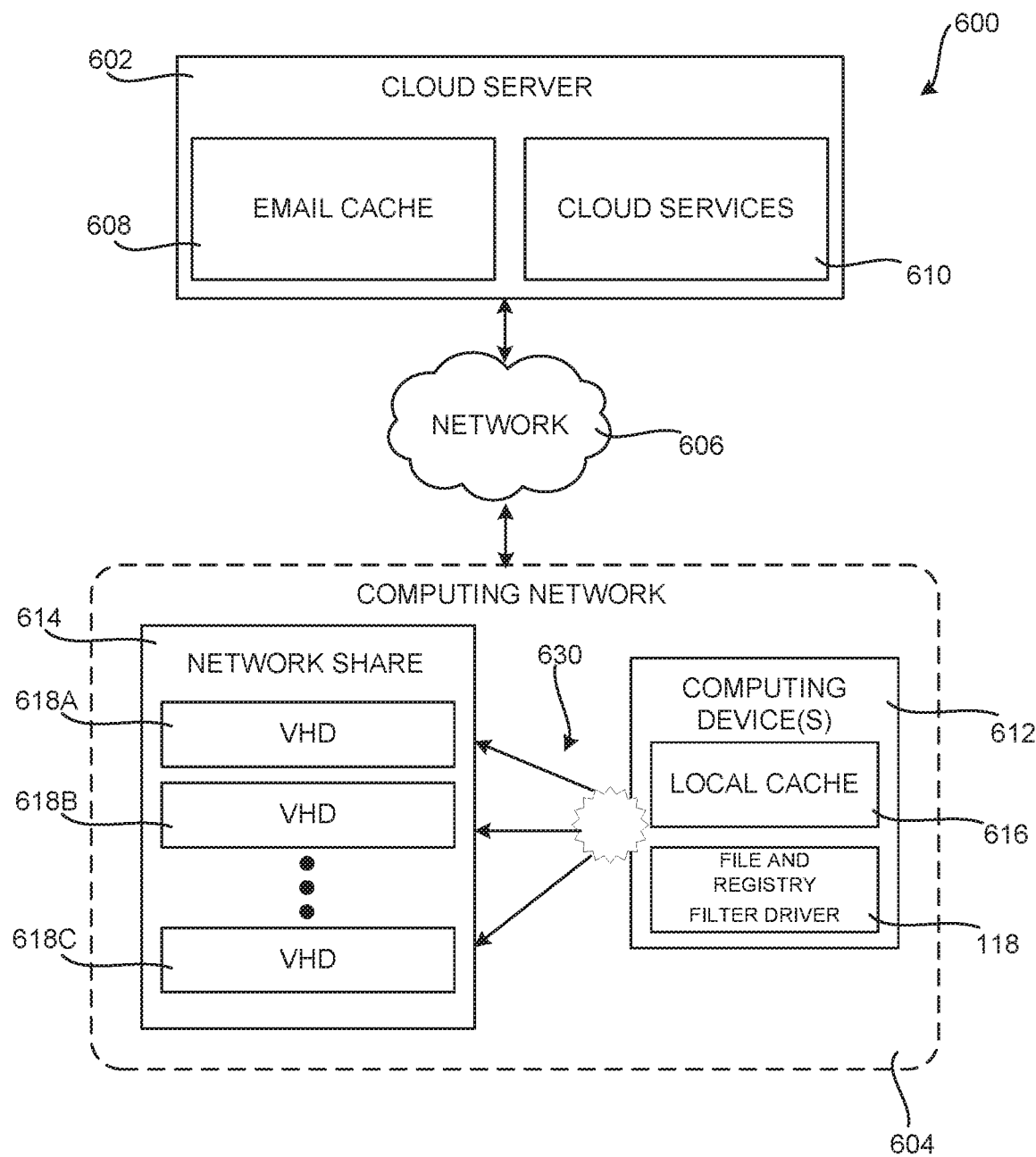
FIG. 6 is a computing architecture diagram illustrating additional aspects of the configuration and operation of a computing system configured to implement the technologies disclosed herein, according to one embodiment of the present disclosure.

Referring now to FIG. 6, aspects of an exemplary split stream process will be described, according to one embodiment of the present disclosure. In various embodiments, the split stream process is performed in a computing environment 600 that includes at least a cloud server 602 (i.e. a network-accessible server, or services) and a computing network 604, where the cloud server 602 and computing network 604 are operatively connected over a communications network 606 (e.g., the internet, a local area network ("LAN"), wide area network ("WAN"), etc.).

In one embodiment, the cloud server 602 may be a third-party server such as an OUTLOOK server, or another remote sever operable to transmit data to computing devices 612 on the computing network 604. In the present embodiment, the cloud server 602 includes an email cache 608 as well as cloud services 610 (i.e. network services provided by way of network, or networks). Data stored at the cloud server 602 is accessible by computing devices 612 on the computing network 604 via the network 606.

In particular embodiments, the computing network 604 includes one or more computing devices 612 configured to support one or more types of OSs. In the present embodiment, the computing network 604 includes a computing device 612 configured with a WINDOWS NT-based OS, which implements an architecture similar to that discussed above with regard to FIG. 1. Other OSs can be utilized in other configurations.

According to various aspects of the present disclosure, a computing device 612 at the computing network 604 may periodically query the cloud server 602 for data from the email cache 608 and/or other cloud services 610 for building a computing environment within the computing network 604. Generally, in conventional systems, large files (such as but not limited to OUTLOOK .OST files) retrieved from the cloud server 602 are stored locally.

However, and discussed herein according to various aspects of the present disclosure, these files may be encapsulated in VHDs 618 accessible via network locations external to the computing device 612, such as in a network share 614. Additionally, and as discussed above, a junction point may be created at a local directory that points to the remote files such that the OS of the computing device 612 references the remote files as if they were stored locally (i.e. on a storage device connected directly to the computing device 612).

In one embodiment, the computing device 612 may allow for data, such as write requests, to be written to and saved at the local cache 616. In various embodiments, the computing device 612 also includes a filter driver 118. According to various aspects of the present disclosure, the filter driver 118 may detect or intercept I/O requests at the computing device 612 and furthermore redirect the I/O requests to one or more VHDs 618 according to a configuration of the junction point, and/or according to additionally stored VHD location references. In various embodiments, the junction point configuration may include references to a configuration file or registry where data identifying additional VHD locations associated with the junction point is persisted.

In particular embodiments, in response to the filter driver 118 detecting an I/O request directed to a local storage location for which a junction point has been defined, the filter driver 118 may query the additionally persisted VHD locations and furthermore redirect the detected I/O request to one or more persisted VHD locations and/or a VHD 618 configured via a junction point.

As shown in the present embodiment, a local cache 616 is included in the same computing device 612 (or computing system in general) as the filter driver 118. In certain embodiments, the local cache 616 is located at a separate computing device 612 or computing system as the filter driver 118, such that the filter driver 118 may intercept an I/O request directed to the separate computing system. The local cache 616 can be sized according to various considerations such as, but not limited to, network bandwidth, available local storage, amount of data written to or read from a VHD 618, and other factors.

According to various aspects of the present disclosure, redirecting an intercepted I/O request to the one or more VHD locations may include generating additional requests substantially similar to the intercepted request, where each additionally generated request includes a separate destination address corresponding to the one or more additional VHD locations.

In one embodiment, each of the additionally generated requests may include substantially similar data (or references to data), however, each additional request is directed to a separate location, which in turn facilitates a "split stream" of the substantially similar data to the separate locations. In some embodiments, this split stream may be accomplished by API calls that transmit the intercepted I/O request to the one or more VHD locations.

In certain embodiments, the computing device(s) 612 within the computing network 604 may be associated with a plurality of VHDs 618, such as the VHDs 618A-618C illustrated in FIG. 6, where the plurality of VHDs 618 encapsulate data, such as redundant system data, system backups, etc.

In various embodiments, the computing device 612 is associated with more than one of the VHDs 618, such as VHD 618A and VHD 618B, where both VHDs encapsulate the same files or data and the service 130 includes one or more junction points referencing both VHD locations. The service 130 might also, or alternately, reference a registry or configuration file that includes additional VHD locations associated with a particular junction point or user.

For example, consider a financial institution that relies on large sets of data including client account histories, credit data, asset information, etc. In this example, the financial institution may implement a computing environment, such as the computing environment 600, for managing this data via one or more VHDs 618. In the event that a primary or preferred VHD (e.g., VHD 618A) were to fail, a secondary VHD (e.g., VHD 618B) may be operable to seamlessly replace the failed primary VHD. According to various aspects of the present disclosure, a secondary VHD 618B may seamlessly replace a failed primary VHD 618A (for example) because the service 130 may initiate transmission of a split stream of data to more than one of the plurality of VHDs 618, thereby simultaneously maintaining more than one instance of the encapsulated files or data.

In some embodiments, the computing device 612 may continue to operate offline or without a connection to the network share 614 and the included VHDs 618. In such a scenario, a user may continue to use the computing device 612, but the requests that would be transmitted to the VHDs 618 at the network share 614 are stored in the local cache 616 until the computing device 612 is reconnected to the network share 614.

In various embodiments, and in response to reconnecting to the network share 614, the service 130 may initiate a split stream data transmission to the appropriate VHDs 618 at the network share 614. For example, a user's virtual desktop at his/her computing device 612 may be attached to the VHD 618A. In addition to being attached to VHD 618A, the user's virtual desktop may also be attached to, include a reference/pointer persisted in a registry or configuration file, or include a junction point to the VHD 618B as a backup or fail-safe VHD 618. Therefore, in response to reconnecting to the network 606, the service 130 may initiate a split stream transmission of the data cached at the local cache 616 to both VHD 618A and VHD 618B in separate but simultaneous streams. In some embodiments, the split data streams may include substantially similar data, or the split data streams may include different data such that one VHD 618 receives only a portion of the data from the local cache 616 for maintaining a lightweight backup, and another VHD 618 receives the entirety of the data.

Figure 7:
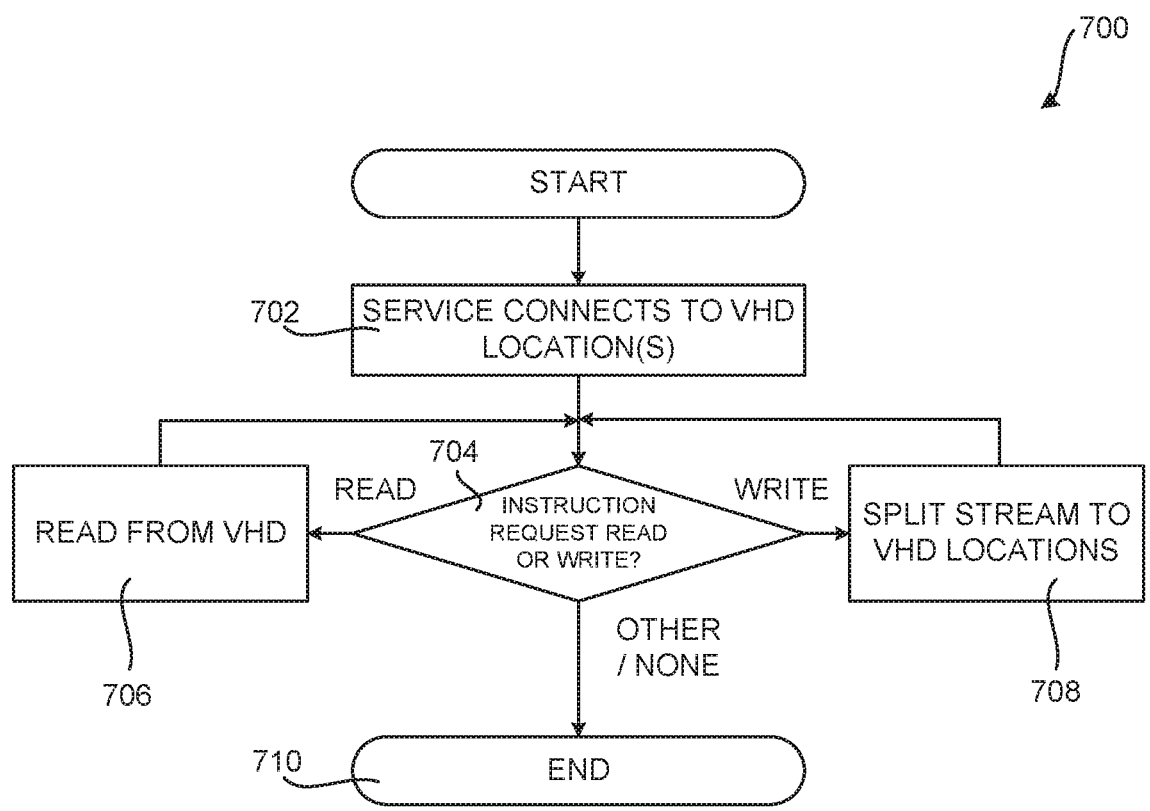
FIG. 7 is a flow diagram showing a routine that illustrates aspects of an exemplary split stream process, according to one embodiment of the present disclosure.

Referring now to FIG. 7, a routine 700 will be described illustrating aspects of an exemplary split stream process, according to one embodiment of the present disclosure. As discussed herein, the service 130 allows for a split stream of I/O requests and other data to be redirected from a local computing device to the network locations of one or more VHDs 618.

The routine 700 begins at operation 702 where the service 130 (e.g., the filter driver 118) connects to the network share 614 or another server that provides a VHD location referenced by a junction point (or persisted in registries or configuration files) at a user's computing device OS. In particular embodiments, connecting to the network share 614 may be a result of the routine 400, or connecting to the network share 614 may be a result of the user's computing device reconnecting to the network share 614 after being temporarily disconnected.

From operation 702, the routine 700 proceeds to operation 704, where the service 130 intercepts an I/O request and furthermore determines the request type (such as a read or write request). In particular embodiments, if the request is a read request, the split stream process may proceed to operation 706 where the service 130 executes a data read from the remote VHD location, as configured by the junction point. However, in particular embodiments, if the request is a write request, the service 130 may execute a data write to the VHD location associated with the referenced junction point, as well as any additional VHD locations persisted in a registry or configuration file associated with the junction point.

According to various aspects of the present disclosure, the service 130 may execute the data writes at operation 708 in a split stream fashion (i.e. simultaneous writes to multiple VHDs 618). In some embodiments, an intercepted I/O request may be redirected to the additionally persisted VHD locations (in a split stream) without also redirecting the I/O request to the encapsulated file referenced by the junction point.

In some embodiments, if the intercepted I/O request at operation 704 is not a read or write request or is otherwise a request that is not recognized by the split stream process (e.g., logon and logoff requests), the routine 700 proceeds from operation 704 to operation 710, where it ends. Additional read and write requests can be processed in the manner shown in FIG. 7 and described above.

Figure 8:
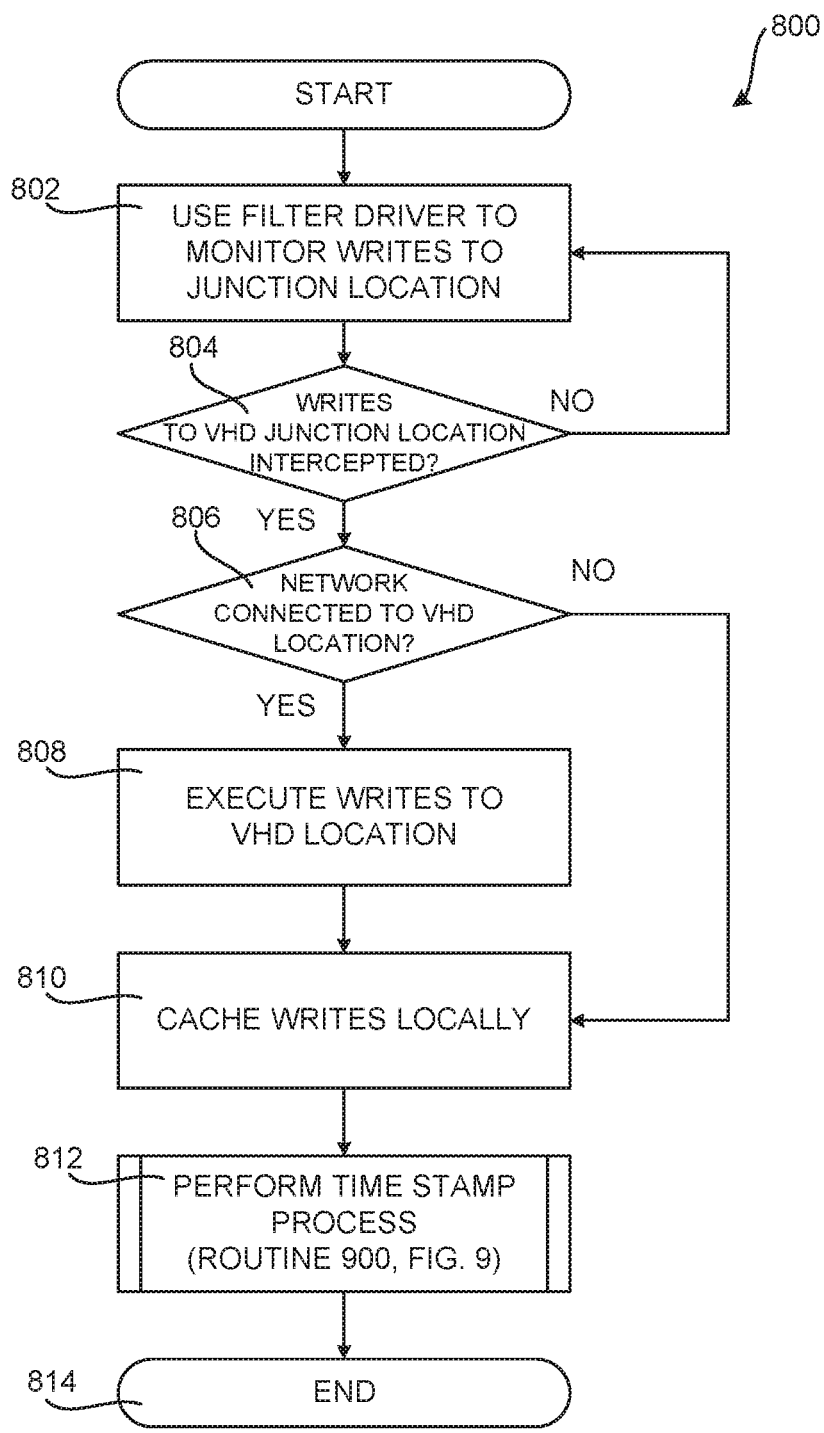
FIG. 8 is a flow diagram showing a routine that illustrates aspects of an exemplary write caching process, according to one embodiment of the present disclosure.

FIG. 8 shows a routine 800 that illustrates aspects of an exemplary write caching process, according to one embodiment of the present disclosure. In various embodiments, the exemplary write caching process allows for I/O requests intercepted by the service 130 to be cached/stored locally, but also written to the corresponding VHD locations based on the VHD junction point as well as the persisted references or pointers to additional VHD locations. According to various aspects of the present disclosure, the exemplary write caching process may allow for a user to continue to use his/her computing device without a connection to the VHD locations, and any requests directed to a VHD location may be locally saved and transmitted (in a split stream fashion) to the VHD locations upon reconnection.

The routine 800 begins at operation 802, where the service 130 monitors write requests (or any other request type) directed to a local directory (which may include a junction point) at the local computing device. According to particular aspects of the present disclosure, the OS at the computing device may be configured to include the service 130 for intercepting I/O requests directed to certain file path directories. As discussed above, the file path directories may be "hidden" from the OS and the contents stored therein may be encapsulated on a VHD 618, where an I/O request directed to the local file may be redirected to the encapsulated file at the network-accessible VHD 618.

From operation 802, the routine 800 proceeds to operation 804, where the service 130 determines if an intercepted write request is directed to a local storage location that includes a junction point to a VHD 618 that includes encapsulated data corresponding to the requested data. If, at operation 804, the service 130 determines that the intercepted write request was not directed to a path that includes a junction point to a VHD location, the write request may continue to execute accordingly, and the routine 800 may proceed back to operation 802.

If, however, the service 130 determines at operation 804 that the intercepted write request is directed to a path that includes a junction point referencing a VHD 618 (or a memory location associated with one or more references or pointers to additional VHD locations), the routine 800 proceeds from operation 804 to operation 806.

At operation 806, the service 130 determines if the local computing device is connected to the target VHD location via the network 606. According to various aspects of the present disclosure, the target VHD location may be the VHD location identified by a junction point as including the encapsulated data or file that the intercepted I/O request is attempting to access at the local storage path.

If the service 130 is connected to the target VHD location, the service 130 may redirect the write request to the target VHD location, or locations, (according to the configured junction point) at operation 808. In addition to redirecting the write request to the target VHD 618, the service 130 may redirect the write request to one or more additional VHD locations using the split stream process described above. According to various aspects of the present disclosure, references or pointers to the additional VHD locations may be persisted in a registry or configuration file accessible by the service 130, and these additional VHD locations may act as redundant copies of the target VHD 618.

In some embodiments, if a VHD 618 remains inaccessible for a threshold period of time (e.g. because of failure, network issues, etc.), then the network location referenced by the junction point can be modified to refer to the location of a different VHD 618. In some embodiments, the location of referred to by the junction point can be modified to point to the location of a different VHD 618 in response to other factors such as, but not limited to, network degradation, policy, etc.

If, at operation 806, the service 130 determines that the computing device cannot connect to the location of the target VHD 618, the routine 800 proceeds from operation 806 to operation 810, where the service 130 may store the write request locally at the local cache to be transmitted to the VHD location at a later time, such as once the service 130 is reconnected to the VHD location or associated network share.

In particular embodiments, regardless of the availability of a network connection to the VHD locations, the service 130 may store and/or execute write requests (or any other appropriate request) to the local cache for maintaining redundancy. In some embodiments, particular requests intercepted by the service 130 may be redirected to the one or more additional VHD locations (via split stream transmission) without also being redirected to the VHD 618 referenced via the junction point.

In various embodiments, after operation 810, the exemplary routine 800 may proceed to operation 812, where a time stamp process is performed. According to various aspects of the present disclosure, the time stamp process allows for cached requests to be maintained in the cache 616 for a predetermined length of time. For example, if the cache 616 needs to be cleared in order to allow new requests to be stored, in some scenarios it may be preferred to erase or overwrite the requests having the oldest timestamps. Details regarding one exemplary timestamp process will be discussed below with reference to FIG. 9. From operation 812, the routine 800 proceeds to operation 814, where it ends.

Figure 9:
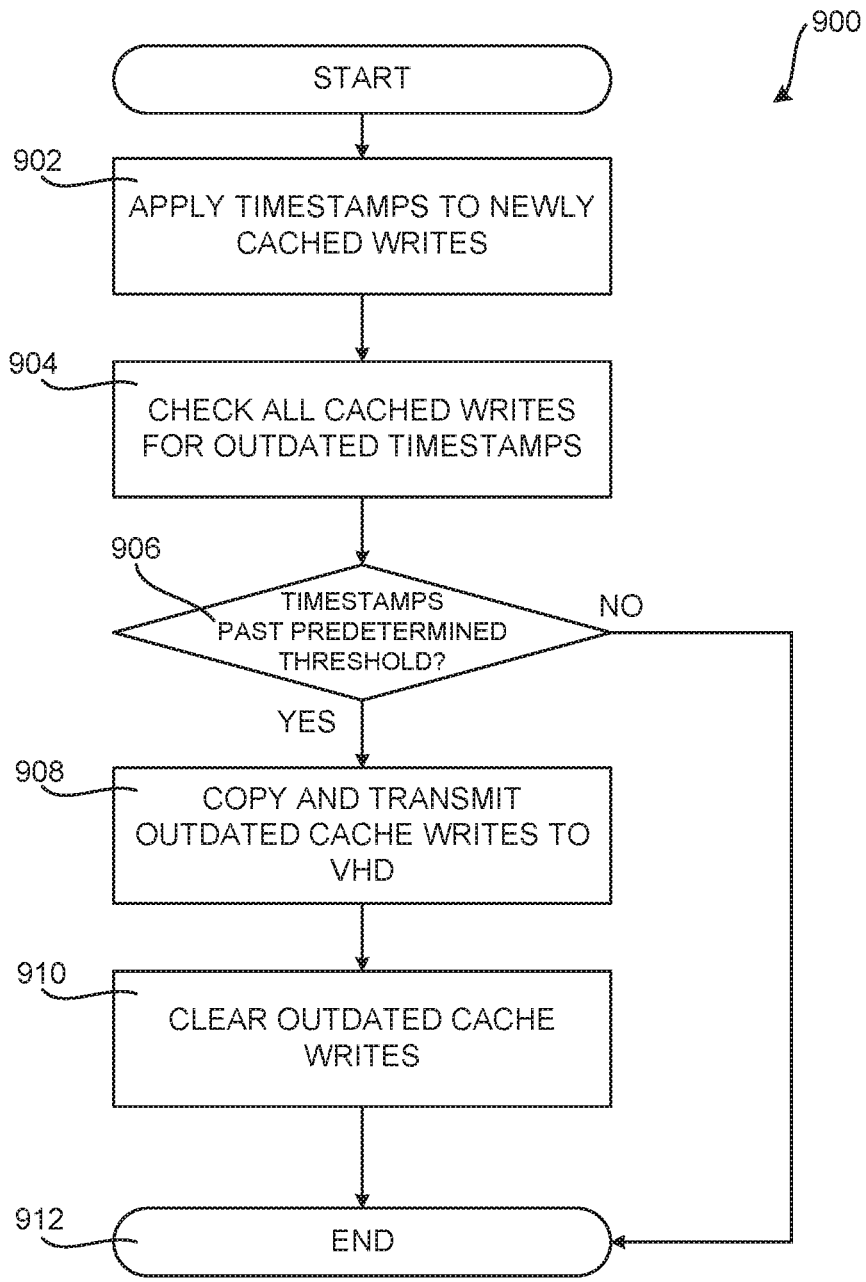
FIG. 9 is a flow diagram showing a routine that illustrates aspects of an exemplary timestamp process, according to one embodiment of the present disclosure.

Turning now to FIG. 9, a routine 900 will be described that illustrates aspects of an exemplary timestamp process, according to one embodiment of the present disclosure. As mentioned above with regard to FIG. 8, intercepted I/O requests may be stored in local cache either for redundancy, or for storing the requests to be transmitted to a VHD location at a later date. One of ordinary skill in the art will understand that cache memory is often limited in size and therefore a valuable computing resource.

In various embodiments, the exemplary timestamp process optimizes I/O request caching by assigning timestamps to the cached requests and furthermore using the timestamps to manage the cache. In some embodiments, the exemplary timestamping and caching process may resemble an optimized push queue configuration.

The routine 900 begins at operation 902, where the service 130 applies timestamps to newly cached requests, such as intercepted write requests. In various embodiments, the timestamps are added as metadata to the cached requests. In some embodiments, the cache 616 includes a portion of memory for storing a timestamp, where the timestamp at the portion of memory indicates the last write to the corresponding cache location.

At operation 904, the service 130 checks the cache 616 for locally saved I/O requests that include outdated timestamps. As mentioned above, cache memory is limited in size, and if the cache includes stored data that does not need to be stored, the performance of the computing device may suffer. Accordingly, the service 130 may check the cache 616 for timestamps that exceed a predetermined time threshold. For example, locations within the cache 616 that include timestamps greater than one day old may need to be cleared in order to create space for new requests. In particular embodiments, this predetermined time threshold may be configured according to a user specified parameter, or the service 130 in general may determine an optimal time threshold based on I/O request activity.

At operation 906, the service 130 determines if timestamps within the cache 616 are past the predetermined time threshold. If, at operation 906, the service 130 determines that no timestamps are past the predetermined time threshold, the routine 600 proceeds from operation 906 to operation 912, where it ends. However, if at operation 906 the service 130 determines that timestamps within the cache 616 are past the predetermined time threshold, the routine 900 may proceed to operation 908, where the service 130 may transmit the outdated cached requests to the proper VHD location(s).

In certain embodiments, operation 908 includes copying and transmitting (or simply transmitting) the cached I/O requests to the VHD location(s). According to various aspects of the present disclosure, this operation allows for the VHD location(s) to maintain a robust record of activity of I/O requests intercepted by the service 130, while the cache memory only includes I/O within a smaller time frame.

From operation 908, the routine 900 proceeds to operation 910, where the service 130 may clear the outdated cached I/O requests from the cache 616. In one embodiment, clearing the cache of "stale" requests allows for the system to add newly intercepted I/O requests to the cache. In one embodiment, because the stale requests were transmitted to the VHD location(s), the service 130 may clear outdated cached requests at operation 910, but also fetch previously cleared requests from the VHD location(s) if needed, as will be discussed below in connection with FIG. 10. From operation 910, the routine 900 proceeds to operation 912, where it ends.

Figure 10:
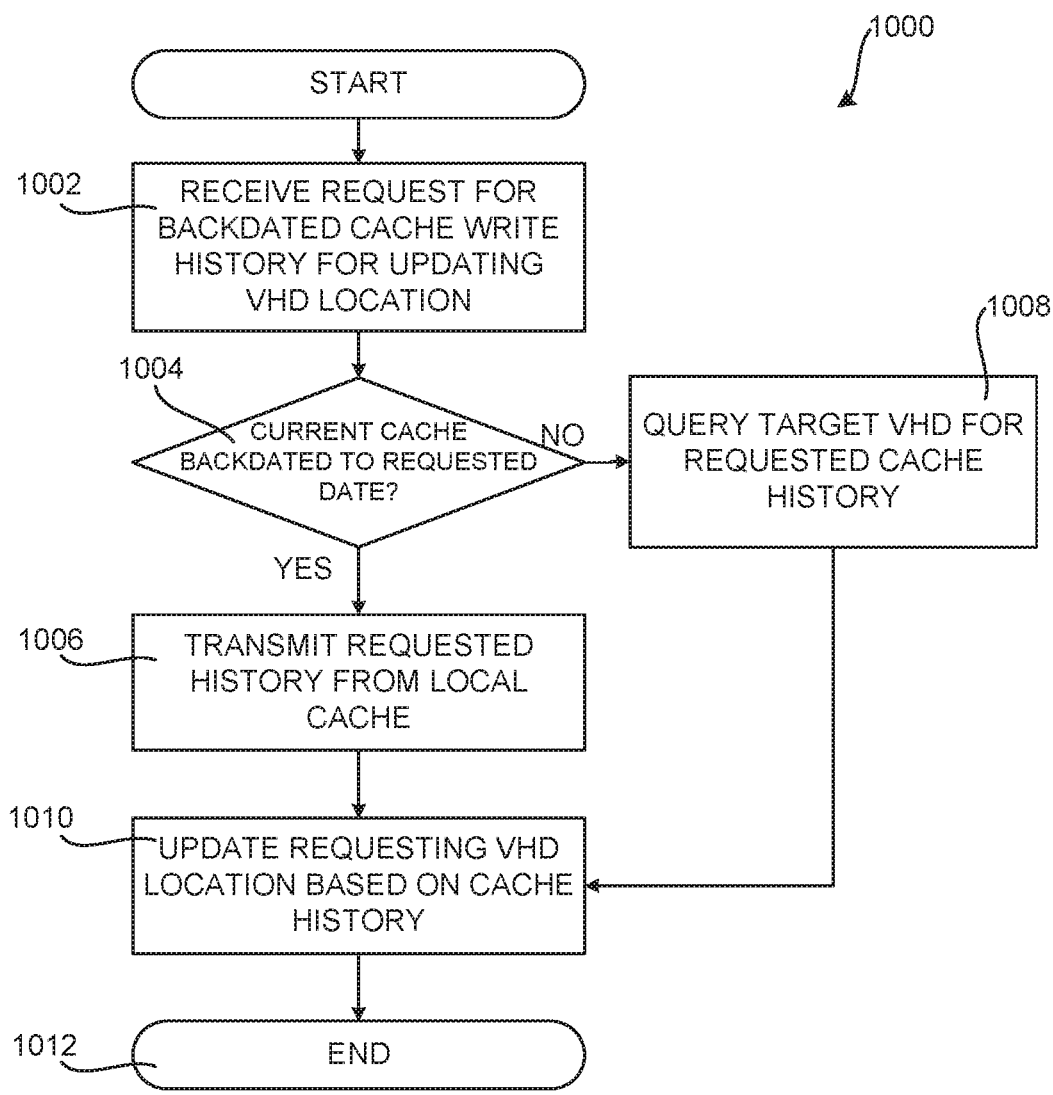
FIG. 10 is a flow diagram showing a routine that illustrates aspects of an exemplary write history revival process, according to one embodiment of the present disclosure.

FIG. 10 is a flow diagram showing a routine 1000 that illustrates aspects of a write history revival process, according to one embodiment of the present disclosure. In various embodiments, including more than one VHD 618 connected to the service 130 allows for the service 130 to store system backups at the more than one VHD 618, where each VHD 618 includes the same backup, or particular VHDs 618 may include backups of only certain portions of data (e.g., data from a particular timeframe).

The routine 1000 begins at operation 1002, where the service 130 receives a request for backdated cached write history. In one embodiment, this request may be a request for a write history spanning back only a few hours, or the request may be for intercepted I/O requests from a particular time window. Furthermore, this request may be initiated for various reasons, one reason in particular being to update a particular VHD location, for example, if the particular VHD location was disconnected from the service 130 at any point in time.

From operation 1002, the routine 1000 proceeds to operation 1004, where the service 130 determines if the current state of the local cache 616 includes intercepted I/O requests to fulfill the request received at operation 1002. If, at operation 1004, it is determined that the local cache 616 includes the requested history, the routine 1000 proceeds to operation 1006, where the service 130 may access the requested history from the local cache 616. However, if, at operation 1004, it is determined that the local cache 616 does not include the requested history, the routine 1000 may proceed from operation 1004 to operation 1008, where the service 130 may query one or more VHD locations for the requested cache history.

After operations 1006 and 1008, the routine 1000 may proceed to operation 1010, where the requesting VHD location is updated based on the accessed cache history. In particular embodiments, the requesting VHD location is updated via writing the accessed cache history to the requesting VHD 618, such that the requesting VHD 618 as a result includes the requested data.

In one embodiment, the accessed cache history is transmitted to more than one VHD location in a split stream for updating the more than one VHD locations according to the requested backdated cache history. In this way, a plurality of VHDs 618 in a network share may include the backdated cache history, or at least a portion of the backdated cache history, for providing the system with robust redundancy. From operation 1010, the routine 1000 proceeds to operation 1012, where it ends.

Figure 11:
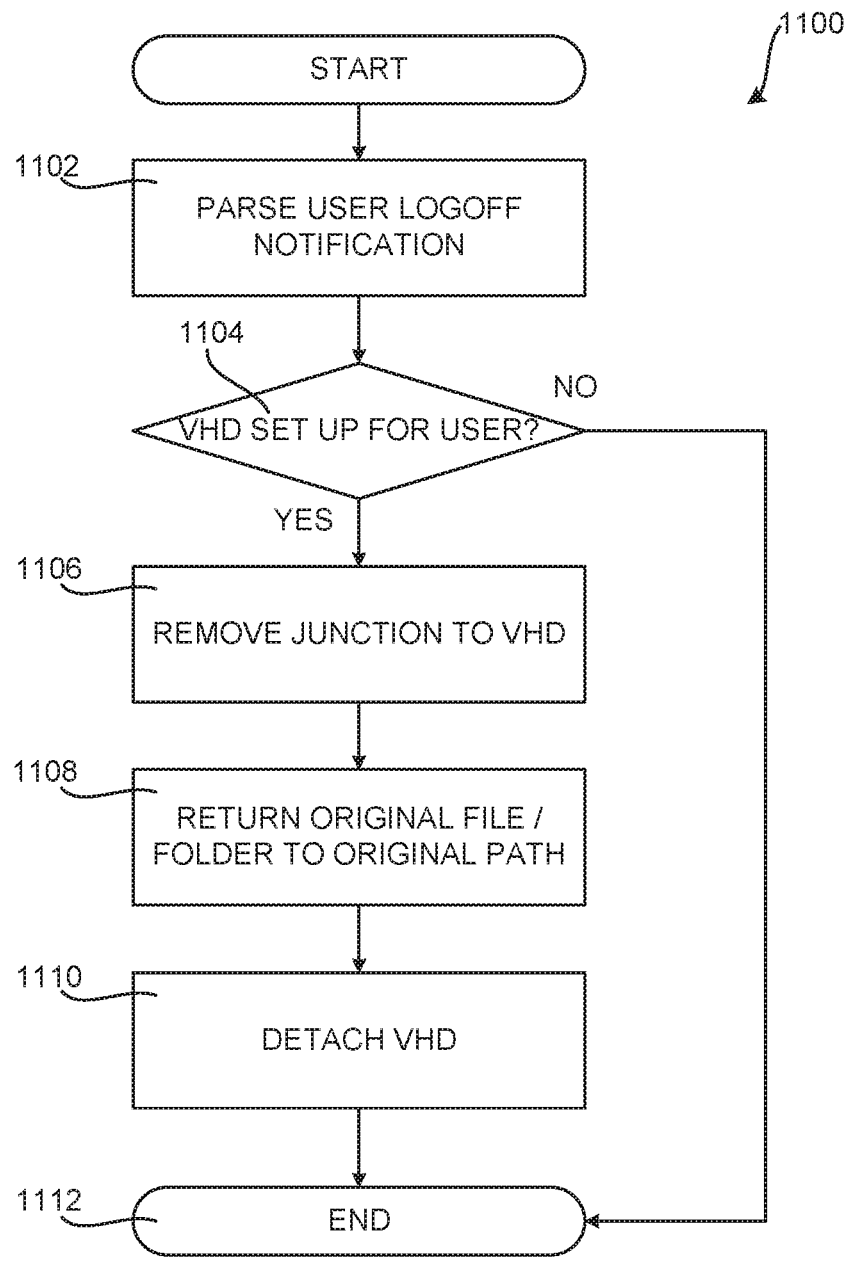
FIG. 11 is a flow diagram showing a routine that illustrates aspects of an exemplary user logoff process, according to one embodiment of the present disclosure.

Referring now to FIG. 11, a routine 1100 will be described that illustrates aspects of an exemplary user logoff process. Generally, the exemplary user logoff process is a process by which the service 130 detaches the VHD 618 (that was attached as part of the exemplary user logon process described above with regard to FIG. 4) and restores the original files/folders to their original file paths (that were changed from their original file paths as part of the exemplary user logon process described above with regard to FIG. 4).

The routine 1100 begins operation 1102, where the service 130 parses a user logoff notification to retrieve the user identification corresponding to the user that is currently logging off of the OS. Generally, the service 130 may extract other data from the logon notification at operation 1102 as appropriate (e.g., time and date information for analytics purposes, etc.). In one embodiment, the service 130 does not implement operation 1102 as it is already aware of the user's identity from the exemplary user logon process described above.

In various embodiments, the service 130 may use the data extracted/parsed from the user logoff notification to determine, at operation 1104, whether a VHD 618 has been set up for the identified user. In one embodiment, the service 130 may, at operation 1104, run diagnostics on the OS and/or computing device to determine whether a VHD 618 is currently attached to the same.

If a VHD 618 is not attached, then, in one embodiment, the exemplary user logoff routine 1100 proceeds from operation 1104 to operation 1112, where it ends. If, however, a VHD 618 is attached, then, in one embodiment, at operation 1106, the service 130 removes the junction point (generated at operation 418 in FIG. 4) to the VHD 618 so that the software program and/or OS can no longer access the VHD 618 and the files/folders encapsulated thereon as if they were the original file/folders.

After removing the junction point, in various embodiments, at operation 1108, the service 130 returns the original file/folder to its original file path (which was modified at operation 416 in FIG. 4) so that the OS/software program may access the original file/folders. In various embodiments, the service 130 detaches the VHD 618 at operation 1110 so that it is no longer accessible to the computing device. After detaching the VHD 618 at operation 1110, the routine 1100 proceeds to operation 1112, where it ends.

Figure 12:
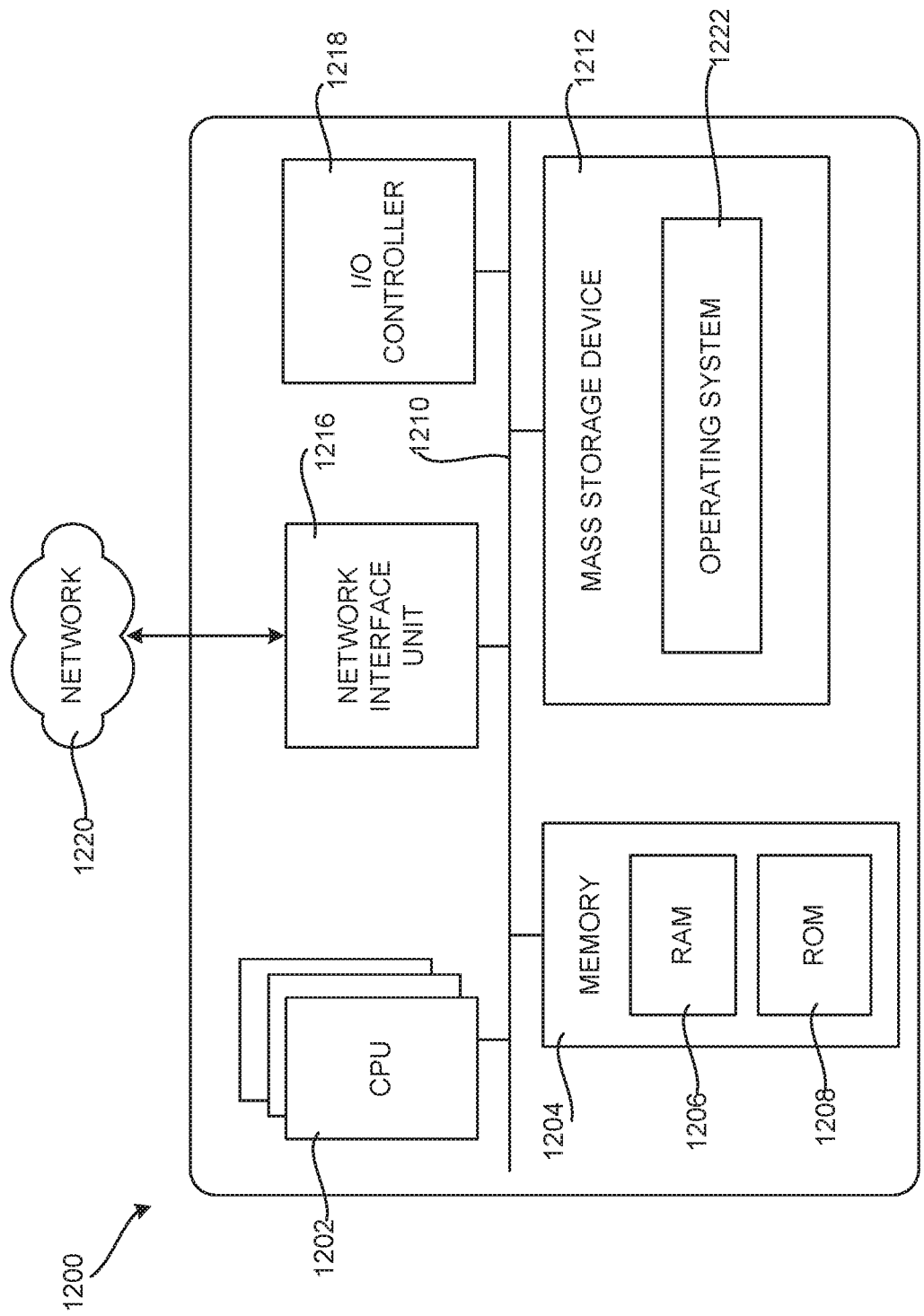
FIG. 12 is a computing architecture diagram showing one illustrative configuration for a computing device configured to implement the technologies disclosed herein, according to one embodiment of the present disclosure.

FIG. 12 is a computer architecture diagram showing an illustrative computer hardware and software architecture for a computing device that can implement the various technologies presented herein. In particular, the architecture illustrated in FIG. 12 can be utilized to implement a server computer, mobile phone, an e-reader, a smartphone, a desktop computer, an AR/VR device, a tablet computer, a laptop computer, or another type of computing device.

The computer 1200 illustrated in FIG. 12 includes a central processing unit 1202 ("CPU"), a system memory 1204, including a random-access memory 1206 ("RAM") and a read-only memory ("ROM") 1208, and a system bus 1210 that couples the memory 1204 to the CPU 1202. A basic input/output system ("BIOS" or "firmware") containing the basic routines that help to transfer information between elements within the computer 1200, such as during startup, can be stored in the ROM 1208. The computer 1200 further includes a mass storage device 1212 for storing an OS 1222, such as a WINDOWS NT-based OS, application programs, and other types of programs. The mass storage device 1212 can also be configured to store other types of programs and data.

The mass storage device 1212 is connected to the CPU 1202 through a mass storage controller (not shown) connected to the bus 1210. The mass storage device 1212 and its associated computer readable media provide non-volatile storage for the computer 1200. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1200. For purposes of the claims, the phrase "computer storage medium," and variations thereof, does not include waves or signals per se or communication media.

According to various configurations, the computer 1200 can operate in a networked environment using logical connections to remote computers through a network such as the network 1220. The computer 1200 can connect to the network 1220 through a network interface unit 1216 connected to the bus 1210. It should be appreciated that the network interface unit 1216 can also be utilized to connect to other types of networks and remote computer systems. The computer 1200 can also include an input/output controller 1218 for receiving and processing input from a number of other devices, including a keyboard, mouse, touch input, an electronic stylus (not shown in FIG. 12), or a physical sensor such as a video camera. Similarly, the input/output controller 1218 can provide output to a display screen or other type of output device (also not shown in FIG. 12).

It should be appreciated that the software components described herein, when loaded into the CPU 1202 and executed, can transform the CPU 1202 and the overall computer 1200 from a general-purpose computing device into a special-purpose computing device customized to facilitate the functionality presented herein. The CPU 1202 can be constructed from any number of transistors or other discrete circuit elements, which can individually or collectively assume any number of states. More specifically, the CPU 1202 can operate as a finite-state machine, in response to executable instructions contained within the software modules disclosed herein. These computer-executable instructions can transform the CPU 1202 by specifying how the CPU 1202 transitions between states, thereby transforming the transistors or other discrete hardware elements constituting the CPU 1202.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1200 in order to store and execute the software components presented herein. It also should be appreciated that the architecture shown in FIG. 12 for the computer 1200, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1200 might not include all of the components shown in FIG. 12, can include other components that are not explicitly shown in FIG. 12, or can utilize an architecture completely different than that shown in FIG. 12.

Figure 13:
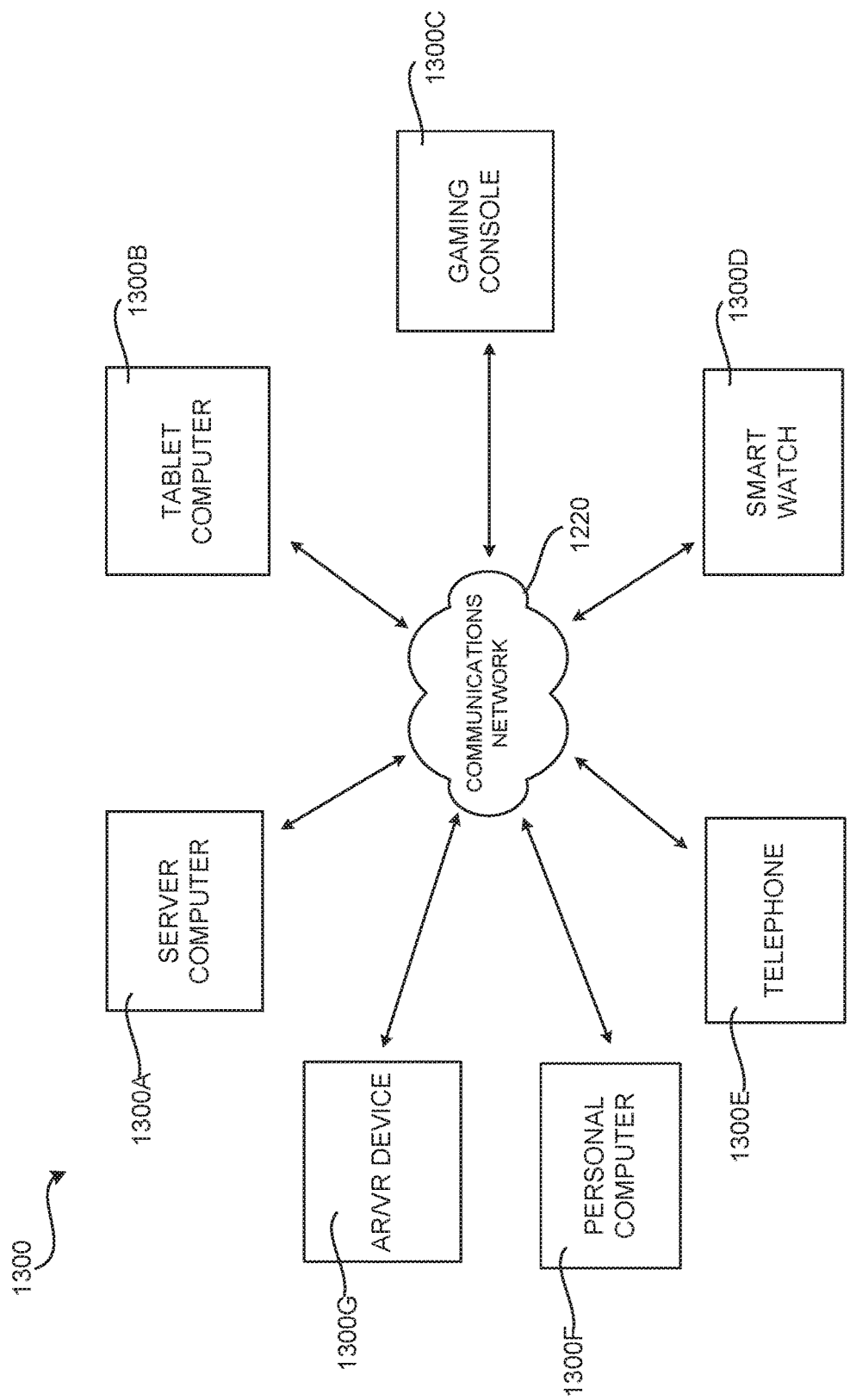
FIG. 13 is a network diagram showing one illustrative configuration for a network environment in which the technologies disclosed herein can be implemented, according to one embodiment of the present disclosure.

FIG. 13 is a network diagram illustrating a distributed network computing environment 1300 in which aspects of the disclosed technologies can be implemented, according to various embodiments presented herein. As shown in FIG. 13, one or more server computers 1300A can be interconnected via a communications network 1220 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1300B, a gaming console 1300C, a smart watch 1300D, a telephone 1300E, such as a smartphone, a personal computer 1300F, and an AR/VR device 1300G.

In a network environment in which the communications network 1220 is the Internet, for example, the server computer 1300A can be a dedicated server computer operable to process and communicate data to and from the client computing devices 1300B-1300G via any of a number of known protocols, such as, hypertext transfer protocol ("HTTP"), file transfer protocol ("FTP"), or simple object access protocol ("SOAP"). Additionally, the networked computing environment 1300 can utilize various data security protocols such as secured socket layer ("SSL") or pretty good privacy ("PGP"). Each of the client computing devices 1300B-1300G can be equipped with an OS operable to support one or more computing applications or terminal sessions such as a web browser (not shown in FIG. 13), or other graphical user interface (not shown in FIG. 13), or a mobile desktop environment (not shown in FIG. 13) to gain access to the server computer 1300A.

The server computer 1300A can be communicatively coupled to other computing environments (not shown in FIG. 13) and receive data regarding a participating user's interactions/resource network. In an illustrative operation, a user (not shown in FIG. 13) may interact with a computing application running on a client computing device 1300B-1300G to obtain desired data and/or perform other computing applications.

The data and/or computing applications may be stored on the server 1300A, or servers 1300A, and communicated to cooperating users through the client computing devices 1300B-1300G over an exemplary communications network 1220. A participating user (not shown in FIG. 13) may request access to specific data and applications housed in whole or in part on the server computer 12800A. These data may be communicated between the client computing devices 1300B-1300G and the server computer 1300A for processing and storage.

The server computer 1300A can host computing applications, processes and applets for the generation, authentication, encryption, and communication of data and applications, and may cooperate with other server computing environments (not shown in FIG. 13), third party service providers (not shown in FIG. 13), network attached storage ("NAS") and storage area networks ("SAN") to realize application/data transactions.

It should be appreciated that the computing architecture shown in FIG. 12 and the distributed network computing environment shown in FIG. 13 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method performed by a computing device, the method comprising: receiving an input/output (I/O) request directed to a location on a local file system of a computing device, the location on the local file system of the computing device being associated with a location on a network-accessible virtual hard disk (VHD); identifying locations on one or more additional network-accessible VHDs associated with the location on the local file system; redirecting the I/O request to the location on the network-accessible VHD; and redirecting the I/O request to the locations on the one or more additional network-accessible VHDs.

Clause 2. The computer-implemented method of clause 1, wherein the I/O request is received at a filter driver, and wherein the filter driver is configured to redirect the I/O request to the location on the network-accessible VHD and to redirect the I/O request to the locations on the one or more additional network-accessible VHDs.

Clause 3. The computer-implemented method of clauses 1 or 2, wherein data identifying the locations on the one or more additional network-accessible VHDs is stored in a registry accessible to the filter driver.

Clause 4. The computer-implemented method of any of clauses 1-3, further comprising storing the I/O request in a local cache of the computing device.

Clause 5. The computer-implemented method of any of clauses 1-4, further comprising storing the I/O request in the local cache of the computing device responsive to determining the network-accessible VHD or the one or more additional network-accessible VHDs is inaccessible.

Clause 6. The computer-implemented method of any of clauses 1-5, further comprising transmitting the I/O request stored in the local cache to the network-accessible VHD and the one or more additional network-accessible VHDs responsive to determining that the network-accessible VHD or the one or more additional network-accessible VHDs are accessible.

Clause 7. The computer-implemented method of any of clauses 1-6, wherein the network-accessible VHD is a primary VHD, wherein one of the one or more additional network-accessible VHDs is a secondary VHD, and wherein the I/O request is performed against the secondary VHD responsive to a connection to the primary VHD being lost.

Clause 8. A computing device, comprising: a processor; and a non-transitory computer-readable storage medium having executable instructions stored thereupon which, when executed by the processor, cause the computing device to: modify a location on a file system local to the computing device such that input/output (I/O) requests directed to the location are redirected to a location on a network-accessible virtual hard disk (VHD); intercept an I/O request directed to the location on the local file system; redirect the intercepted I/O request to the location on the remotely-located VHD; and redirect the intercepted I/O request to locations on one or more additional network-accessible VHDs, the one or more additional network-accessible VHDs being associated with the location on the file system local to the computing device.

Clause 9. The computing device of clause 8, wherein the non-transitory computer-readable storage medium has further executable instructions stored thereupon to change a path of the location on the file system local to the computing device such that the location is inaccessible prior to modifying the location.

Clause 10. The computing device of clauses 8 or 9, wherein the location on the file system local to the computing device is modified responsive to receiving a notification that a user has logged on to the computing device.

Clause 11. The computing device of any of clauses 8-10, wherein the non-transitory computer-readable storage medium has further executable instructions stored thereupon to modify the location on the file system local to the computing device such that I/O requests directed to the location are not redirected to the location on the network-accessible VHD in response to receiving a notification that a user has logged off of the computing device.

Clause 12. The computing device of any of clauses 8-11, wherein the location on the file system is modified by associating a junction point with the location, the junction point defining the location on the remotely-located VHD.

Clause 13. The computing device of any of clauses 8-12, wherein the non-transitory computer-readable storage medium has further executable instructions stored thereupon to store the I/O request in a local cache of the computing device.

Clause 14. The computing device of any of clauses 8-13, wherein the I/O request is stored in the local cache of the computing device responsive to determining the network-accessible VHD or the one or more additional network-accessible VHDs is inaccessible.

Clause 15. The computing device of any of clauses 8-14, wherein the non-transitory computer-readable storage medium has further executable instructions stored thereupon to transmit the I/O request stored in the local cache to the network-accessible VHD and the one or more additional network-accessible VHDs responsive to determining that the network-accessible VHD or the one or more additional network-accessible VHDs are accessible.

Clause 16. A non-transitory computer-readable storage medium having computer-executable instructions stored thereupon which, when executed by a computing device, cause the computing device to: modify a location on a file system local to the computing device such that input/output (I/O) requests directed to the location are redirected to a location on a network-accessible virtual hard disk (VHD); intercept an I/O request directed to the location on the local file system; redirect the intercepted I/O request to the location on the remotely-located VHD; and redirect the intercepted I/O request to locations on one or more additional network-accessible VHDs, the one or more additional network-accessible VHDs being associated with the location on the file system local to the computing device.

Clause 17. The non-transitory computer-readable storage medium of clause 16, having further computer-executable instructions stored thereupon to change a path of the location on the file system local to the computing device such that the location is inaccessible prior to modifying the location.

Clause 18. The non-transitory computer-readable storage medium of clauses 16 or 17, wherein the location on the file system is modified by associating a junction point with the location, the junction point defining the location on the remotely-located VHD.

Clause 19. The non-transitory computer-readable storage medium of any of clauses 16-18, wherein the non-transitory computer-readable storage medium has further executable instructions stored thereupon to store the I/O request in a local cache of the computing device.

Clause 20. The non-transitory computer-readable storage medium of any of clauses 16-19, wherein data identifying the locations on the one or more additional network-accessible VHDs is stored in a registry accessible to the filter driver.

CONCLUSION

Based on the foregoing, it should be appreciated that technologies for redirecting input/output I/O requests to VHDs to improve network performance and data redundancy have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

Many modifications and other embodiments of the technologies disclosed herein may come to mind to one skilled in the art to which this invention pertains having the benefit of the teachings presented in the foregoing descriptions and the associated drawings. While several examples discussed above are illustrated with regard to a MICROSOFT OUTLOOK data file and with regard to a WINDOWS NT-based OS, the technologies described herein may be used in any other suitable context. Therefore, it is to be understood that the technologies described herein are not to be limited to the specific embodiments disclosed and that modifications and other embodiments are intended to be included within the scope of the appended claims. Although specific terms are employed herein, they are used in a generic and descriptive sense only and not for the purposes of limitation.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computing device, comprising:
   a processor; and
   a non-transitory computer-readable storage medium having executable instructions stored thereupon which, when executed by the processor, cause the computing device to:
   modify a location on a file system local to the computing device such that input/output (I/O) requests directed to the location are redirected to a location on a network-accessible virtual hard disk (VHD);
   intercept an I/O request directed to the location on the file system local to the computing device;
   redirect the intercepted I/O request to the location on the network-accessible VHD; and
   redirect the intercepted I/O request to locations on one or more additional network-accessible VHDs, the one or more additional network-accessible VHDs being associated with the location on the file system local to the computing device.

2. The computing device of claim 1, wherein the non-transitory computer-readable storage medium has further executable instructions stored thereupon to change a path of the location on the file system local to the computing device such that the location is inaccessible prior to modifying the location.

3. The computing device of claim 1, wherein the location on the file system local to the computing device is modified responsive to receiving a notification that a user has logged on to the computing device.

4. The computing device of claim 1, wherein the non-transitory computer-readable storage medium has further executable instructions stored thereupon to modify the location on the file system local to the computing device such that I/O requests directed to the location are not redirected to the location on the network-accessible VHD in response to receiving a notification that a user has logged off of the computing device.

5. The computing device of claim 1, wherein the location on the file system local to the computing device is modified by associating a junction point with the location, the junction point defining the location on the network-accessible VHD.

6. The computing device of claim 1, wherein the non-transitory computer-readable storage medium has further executable instructions stored thereupon to store the I/O request in a local cache of the computing device.

7. The computing device of claim 6, wherein the I/O request is stored in the local cache of the computing device responsive to determining the network-accessible VHD or the one or more additional network-accessible VHDs is inaccessible.

8. The computing device of claim 6, wherein the non-transitory computer-readable storage medium has further executable instructions stored thereupon to transmit the I/O request stored in the local cache to the network-accessible VHD and the one or more additional network-accessible VHDs responsive to determining that the network-accessible VHD or the one or more additional network-accessible VHDs are accessible.

9. A non-transitory computer-readable storage medium having computer-executable instructions stored thereupon which, when executed by a computing device, cause the computing device to:
   modify a location on a file system local to the computing device such that input/output (I/O) requests directed to the location are redirected to a location on a network-accessible virtual hard disk (VHD);
   intercept an I/O request directed to the location on the file system local to the computing device;
   redirect the intercepted I/O request to the location on the network-accessible VHD; and
   redirect the intercepted I/O request to locations on one or more additional network-accessible VHDs, the one or more additional network-accessible VHDs being associated with the location on the file system local to the computing device.

10. The non-transitory computer-readable storage medium of claim 9, having further computer-executable instructions stored thereupon to change a path of the location on the file system local to the computing device such that the location is inaccessible prior to modifying the location.

11. The non-transitory computer-readable storage medium of claim 9, wherein the location on the file system local to the computing device is modified by associating a junction point with the location, the junction point defining the location on the network-accessible VHD.

12. The non-transitory computer-readable storage medium of claim 9, wherein the non-transitory computer-readable storage medium has further executable instructions stored thereupon to store the I/O request in a local cache of the computing device.

13. The non-transitory computer-readable storage medium of claim 9, wherein data identifying the locations on the one or more additional network-accessible VHDs is stored in a registry accessible to the filter driver.

14. A computer-implemented method, comprising:
    modifying a location on a file system local to a computing device such that input/output (I/O) requests directed to the location are redirected to a location on a network-accessible virtual hard disk (VHD);
    intercepting an I/O request directed to the location on the file system local to the computing device;
    redirecting the intercepted I/O request to the location on the network-accessible VHD; and
    redirecting the intercepted I/O request to locations on one or more additional network-accessible VHDs, the one or more additional network-accessible VHDs being associated with the location on the file system local to the computing device.

15. The computer-implemented method of claim 14, further comprising changing a path of the location on the file system local to the computing device such that the location is inaccessible prior to modifying the location.

16. The computer-implemented method of claim 14, wherein the location on the file system local to the computing device is modified responsive to receiving a notification that a user has logged on to the computing device.

17. The computer-implemented method of claim 14, further comprising modifying the location on the file system local to the computing device such that I/O requests directed to the location are not redirected to the location on the network-accessible VHD in response to receiving a notification that a user has logged off of the computing device.

18. The computing device of claim 14, wherein the location on the file system local to the computing device is modified by associating a junction point with the location, the junction point defining the location on the network-accessible VHD.

19. The computer-implemented method of claim 14, further comprising storing the I/O request in a local cache of the computing device.

20. The computer-implemented method of claim 19, wherein the I/O request is stored in the local cache of the computing device responsive to determining the network-accessible VHD or the one or more additional network-accessible VHDs is inaccessible.

\* \* \* \* \*